US012079764B2

(12) United States Patent
Calvo et al.

(10) Patent No.: US 12,079,764 B2
(45) Date of Patent: Sep. 3, 2024

(54) INTEGRATION OF THIRD PARTY DELIVERY SERVICE INTERFACE INTO ONLINE RETAIL PLATFORM

(71) Applicant: Target Brands, Inc., Minneapolis, MN (US)

(72) Inventors: Mike Calvo, Minneapolis, MN (US); Chris Johnson, Minneapolis, MN (US); Rob Anderson, Minneapolis, MN (US); Peter Guidarelli, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 1066 days.

(21) Appl. No.: 16/405,718

(22) Filed: May 7, 2019

(65) Prior Publication Data
US 2020/0160269 A1     May 21, 2020

Related U.S. Application Data

(60) Provisional application No. 62/768,719, filed on Nov. 16, 2018.

(51) Int. Cl.
*G06Q 10/0835*     (2023.01)
*G06Q 10/0834*     (2023.01)
*G06Q 30/0601*     (2023.01)

(52) U.S. Cl.
CPC ... *G06Q 10/08355* (2013.01); *G06Q 10/0834* (2013.01); *G06Q 30/0613* (2013.01);
(Continued)

(58) Field of Classification Search
CPC ......... G06Q 10/08355; G06Q 10/0834; G06Q 30/0613
See application file for complete search history.

(56) References Cited

U.S. PATENT DOCUMENTS 7,003,720 B1     2/2006  Davidson et al.
7,263,668 B1 *   8/2007  Lentz .................... G06F 3/0482
                                                       715/800

(Continued)

FOREIGN PATENT DOCUMENTS

CN    111369288 A  *  7/2020
EP      3876173 A1  *  9/2021  ............. G06N 20/00

(Continued)

OTHER PUBLICATIONS

David Setzke, "Matching Drivers and Transportation Requests in Crowdsourced Delivery Systems", published by 23rd Americas Conference on Information system, in 2017, all pages (Year: 2017).*

(Continued)

*Primary Examiner* — Omar Zeroual
(74) *Attorney, Agent, or Firm* — Merchant & Gould P.C.

(57) ABSTRACT

Methods and systems for integrating same-day delivery services with an online retailer platform are disclosed. Graphical user interfaces are displayed on a retailer website for browsing and selecting items for purchase. Delivery options are provided including those for same-day delivery. A delivery service can provide available schedule delivery timeframes to be displayed on a GUI of the retailer website. A customer selects a delivery window for delivery of items selected for same-day delivery. The delivery windows are communicated through an integration API. Features presented to the customer during a shopping experience from item selection to checkout can be seamlessly presented to the user from both the retailer and the delivery service. Payment can be managed by the retailer rather than passed through the delivery service.

16 Claims, 19 Drawing Sheets

(52) U.S. Cl.
CPC ..... *G06Q 30/0633* (2013.01); *G06Q 30/0639* (2013.01); *G06Q 30/0641* (2013.01)

(56) References Cited

U.S. PATENT DOCUMENTS

| | | | | |
|---|---|---|---|---|
| 8,429,019 B1* | 4/2013 | Yeatts | | G06Q 10/083 |
| | | | | 705/26.1 |
| 8,831,975 B2* | 9/2014 | Golden | | G06Q 30/00 |
| | | | | 705/14.1 |
| 8,965,791 B1* | 2/2015 | Bell | | G06Q 20/202 |
| | | | | 705/17 |
| 9,934,530 B1* | 4/2018 | Iacono | | G06Q 30/0639 |
| 10,127,517 B2* | 11/2018 | Carr | | G06Q 30/0633 |
| 10,176,448 B1* | 1/2019 | Rhodes | | G01S 19/14 |
| 10,346,889 B1* | 7/2019 | Reiss | | G06Q 10/0833 |
| 10,348,916 B2* | 7/2019 | Nagata | | G06F 9/451 |
| 10,366,381 B2* | 7/2019 | Bell | | G06Q 20/204 |
| 10,410,194 B1* | 9/2019 | Grassadonia | | G06Q 20/3278 |
| 10,430,926 B1* | 10/2019 | Cook | | G06F 40/106 |
| 10,467,601 B1* | 11/2019 | Bricca | | G06F 16/9566 |
| 10,636,019 B1* | 4/2020 | Abrons | | G06Q 30/0207 |
| 10,754,916 B1* | 8/2020 | Rehn | | G06Q 10/0833 |
| 10,778,598 B1* | 9/2020 | Fritz | | H04L 47/12 |
| 10,789,566 B1 | 9/2020 | Masterman | | |
| 10,909,486 B1 | 2/2021 | Tsou | | |
| 10,915,855 B2* | 2/2021 | Sharma | | G06Q 10/0836 |
| 10,997,645 B1* | 5/2021 | Philbin | | G01S 19/52 |
| 11,074,539 B2* | 7/2021 | Tiderington | | G07C 5/008 |
| 11,120,394 B2* | 9/2021 | Anderson | | G06Q 10/0836 |
| 11,244,299 B1* | 2/2022 | Pittack | | G06Q 30/3224 |
| 11,315,190 B1* | 4/2022 | Brandmaier | | G08G 1/205 |
| 2002/0007299 A1* | 1/2002 | Florence | | G06Q 10/08355 |
| | | | | 705/7.12 |
| 2002/0007326 A1 | 1/2002 | Hashimoto et al. | | |
| 2002/0046076 A1* | 4/2002 | Baillargeon | | G06Q 10/02 |
| | | | | 705/5 |
| 2004/0117315 A1 | 6/2004 | Cornuejols | | |
| 2004/0205568 A1* | 10/2004 | Breuel | | G06F 40/166 |
| | | | | 715/205 |
| 2005/0043996 A1* | 2/2005 | Silver | | G06Q 50/12 |
| | | | | 705/15 |
| 2005/0071758 A1* | 3/2005 | Ehrich | | G06F 9/451 |
| | | | | 715/234 |
| 2006/0178951 A1* | 8/2006 | Rund | | G06Q 10/0836 |
| | | | | 705/14.1 |
| 2006/0235739 A1* | 10/2006 | Levis | | G06Q 10/08 |
| | | | | 705/1.1 |
| 2007/0011017 A1* | 1/2007 | Field | | G06Q 10/083 |
| | | | | 705/330 |
| 2007/0198339 A1* | 8/2007 | Shen | | G06Q 30/0276 |
| | | | | 705/14.64 |
| 2007/0237096 A1* | 10/2007 | Vengroff | | H04W 4/02 |
| | | | | 370/254 |
| 2009/0037095 A1 | 2/2009 | Jani et al. | | |
| 2009/0099965 A1* | 4/2009 | Grant, IV | | G06Q 20/3433 |
| | | | | 705/41 |
| 2012/0084129 A1 | 4/2012 | Golden et al. | | |
| 2013/0185124 A1* | 7/2013 | Aaron | | G06Q 20/326 |
| | | | | 705/13 |
| 2013/0198042 A1* | 8/2013 | Seifen | | G06Q 10/083 |
| | | | | 705/26.81 |
| 2013/0246301 A1* | 9/2013 | Radhakrishnan | | G06Q 30/0282 |
| | | | | 705/347 |
| 2014/0025524 A1* | 1/2014 | Sims | | G06Q 30/0639 |
| | | | | 705/330 |
| 2014/0052613 A1* | 2/2014 | Tavakoli | | G06Q 20/3224 |
| | | | | 705/39 |
| 2014/0067499 A1* | 3/2014 | Stepanovich | | G06Q 30/0214 |
| | | | | 705/14.16 |
| 2014/0160143 A1* | 6/2014 | Ballestad | | G06T 5/92 |
| | | | | 345/589 |
| 2014/0172739 A1 | 6/2014 | Anderson et al. | | |
| 2014/0351033 A1* | 11/2014 | Azevedo | | G06Q 30/0239 |
| | | | | 705/14.19 |
| 2015/0039450 A1* | 2/2015 | Hernblad | | G06Q 20/202 |
| | | | | 705/15 |
| 2015/0100433 A1* | 4/2015 | Choy | | G06Q 30/0635 |
| | | | | 705/26.81 |
| 2015/0142594 A1* | 5/2015 | Lutnick | | G06Q 20/202 |
| | | | | 705/26.81 |
| 2015/0154559 A1* | 6/2015 | Barbush | | G06Q 10/08355 |
| | | | | 705/338 |
| 2015/0178712 A1* | 6/2015 | Angrish | | G06Q 20/20 |
| | | | | 705/5 |
| 2015/0186869 A1* | 7/2015 | Winters | | G06Q 10/08 |
| | | | | 705/26.81 |
| 2015/0193779 A1* | 7/2015 | Lima | | G06Q 30/018 |
| | | | | 705/317 |
| 2015/0235304 A1* | 8/2015 | Vincent | | G06Q 30/0641 |
| | | | | 705/26.8 |
| 2015/0262121 A1* | 9/2015 | Riel-Dalpe | | G06Q 50/12 |
| | | | | 705/15 |
| 2015/0294262 A1 | 10/2015 | Nelson et al. | | |
| 2016/0071056 A1* | 3/2016 | Ellison | | G06Q 10/08355 |
| | | | | 705/338 |
| 2016/0148300 A1* | 5/2016 | Carr | | G06Q 30/0633 |
| | | | | 705/26.8 |
| 2016/0180287 A1* | 6/2016 | Chan | | G06Q 30/0255 |
| | | | | 705/333 |
| 2016/0210591 A1* | 7/2016 | Lafrance | | G06Q 10/047 |
| 2016/0257401 A1* | 9/2016 | Buchmueller | | G01C 21/343 |
| 2016/0379167 A1* | 12/2016 | Raman | | G06Q 10/1097 |
| | | | | 705/338 |
| 2016/0379202 A1* | 12/2016 | Turner | | G06Q 20/321 |
| | | | | 705/39 |
| 2017/0011340 A1* | 1/2017 | Gabbai | | G06Q 10/0836 |
| 2017/0024804 A1 | 1/2017 | Tepfenhart, Jr. et al. | | |
| 2017/0039540 A1* | 2/2017 | Bell | | G06Q 30/02 |
| 2017/0078504 A1* | 3/2017 | Nagata | | G09G 5/14 |
| 2017/0103490 A1* | 4/2017 | Haparnas | | H04W 4/023 |
| 2017/0116562 A1* | 4/2017 | Schroeder | | G06Q 10/083 |
| 2017/0124511 A1* | 5/2017 | Mueller | | H04W 4/029 |
| 2017/0270518 A1 | 9/2017 | Kylänpää | | |
| 2017/0278062 A1 | 9/2017 | Mueller et al. | | |
| 2017/0357617 A1* | 12/2017 | Ekanayake | | G06F 40/174 |
| 2018/0012151 A1* | 1/2018 | Wang | | G06Q 10/08 |
| 2018/0025318 A1* | 1/2018 | Baggott | | G06Q 10/047 |
| | | | | 705/334 |
| 2018/0068374 A1* | 3/2018 | Turlay | | G06Q 20/18 |
| 2018/0089660 A1* | 3/2018 | Elliott | | G06Q 20/383 |
| 2018/0095604 A1* | 4/2018 | Nguyen | | G06F 40/186 |
| 2018/0174093 A1* | 6/2018 | Perez | | G06Q 10/083 |
| 2018/0240181 A1* | 8/2018 | Lopez | | G06Q 10/00 |
| 2018/0247261 A1* | 8/2018 | Smith | | G06Q 10/0833 |
| 2018/0276602 A1* | 9/2018 | Rivalto | | G06Q 20/308 |
| 2018/0356823 A1* | 12/2018 | Cooper | | G05D 1/0202 |
| 2018/0365644 A1* | 12/2018 | Smith | | G06Q 10/0837 |
| 2018/0365725 A1* | 12/2018 | Smith | | G06Q 30/0639 |
| 2019/0051174 A1* | 2/2019 | Haque | | G08G 1/202 |
| 2019/0066516 A1* | 2/2019 | Kuhara | | G05D 1/0016 |
| 2019/0080275 A1* | 3/2019 | Brownell | | G06Q 50/01 |
| 2019/0108520 A1 | 4/2019 | Zeltzer et al. | | |
| 2019/0114666 A1* | 4/2019 | Kohli | | G06Q 10/083 |
| 2019/0121522 A1* | 4/2019 | Davis | | G06V 40/28 |
| 2019/0138983 A1* | 5/2019 | Endo | | G06Q 10/083 |
| 2019/0164118 A1* | 5/2019 | Sandberg | | G06F 16/27 |
| 2019/0164144 A1* | 5/2019 | Hebert | | G06Q 30/0635 |
| 2019/0205857 A1* | 7/2019 | Bell | | G06Q 10/08 |
| 2019/0244448 A1* | 8/2019 | Alamin | | G07C 9/00896 |
| 2019/0251621 A1* | 8/2019 | Harmon | | G06Q 20/12 |
| 2019/0255573 A1* | 8/2019 | Chen | | G06Q 10/08355 |
| 2019/0287063 A1* | 9/2019 | Skaaksrud | | G05D 1/65 |
| 2019/0297467 A1* | 9/2019 | Vengroff | | H04L 67/306 |
| 2019/0304004 A1 | 10/2019 | Schwantes et al. | | |
| 2019/0378080 A1* | 12/2019 | Srinivasan | | G06Q 20/208 |
| 2019/0378081 A1* | 12/2019 | Swartz | | G06Q 10/083 |
| 2020/0082459 A1* | 3/2020 | Varma | | G06Q 20/102 |
| 2020/0151631 A1* | 5/2020 | Lamers | | G05D 1/0088 |
| 2020/0151660 A1* | 5/2020 | Warr | | G06Q 10/06311 |
| 2020/0160428 A1* | 5/2020 | Calvo | | G06Q 30/0633 |
| 2020/0250721 A1* | 8/2020 | Dana | | G06F 21/6254 |
| 2020/0273431 A1* | 8/2020 | Dong | | G09G 5/37 |

(56) References Cited

U.S. PATENT DOCUMENTS

| | | | |
|---|---|---|---|
| 2021/0089995 A1* | 3/2021 | Iacono | G06Q 10/083 |
| 2021/0097590 A1* | 4/2021 | Canseco | G06Q 30/0613 |
| 2021/0133724 A1* | 5/2021 | Harris | G06Q 20/3276 |
| 2021/0142391 A1* | 5/2021 | van Horne | G06F 3/04842 |
| 2021/0255985 A1* | 8/2021 | Schneider | G06Q 20/204 |
| 2021/0365885 A1* | 11/2021 | Timonen | G06Q 10/0835 |
| 2022/0058613 A1* | 2/2022 | Maxwell | G06Q 20/12 |

FOREIGN PATENT DOCUMENTS

| | | | |
|---|---|---|---|
| WO | WO-0175746 A2 * | 10/2001 | G06Q 10/087 |
| WO | WO-0198869 A2 * | 12/2001 | H04N 1/00209 |
| WO | WO-2005072328 A2 * | 8/2005 | G06Q 10/00 |
| WO | WO-2012050579 A1 * | 4/2012 | G06Q 10/067 |
| WO | WO-2015084688 A1 * | 6/2015 | G06Q 10/087 |
| WO | WO-2017197468 A1 * | 11/2017 | |
| WO | WO-2019198858 A1 * | 10/2019 | G06Q 10/083 |
| WO | WO-2020054118 A1 * | 3/2020 | G06Q 10/08345 |
| WO | WO-2020207418 A1 * | 10/2020 | |
| WO | WO-2020240731 A1 * | 12/2020 | |

OTHER PUBLICATIONS

Jean-Francois Rouges, "Crowdsourcing delivery: New interconnected business models to reinvent delivery", published by 1st International Physical Internet Conference, in 2014, all pages (Year: 2014).*

Instacart: Groceries Delivered From Local Stores, Groceries in as little as 1 hour (Delivery/Pickup); https://www.instacart.com; Dated: Apr. 26, 2019; 18 Pages.

Amazon Prime Now—Shop on the Go. Checkout; Dated: Apr. 26, 2019; 9 Pages.

Kowalski's Markets: Order Online, Cakes, Hot Food & More; Grocery Delivery & Pickup; Dated: Apr. 26, 2019; 11 Pages.

Walmart Grocery - Reserve a Time (available at grocery.walmart.com); Dated May 6, 2019, 1 page.

Walmart Grocery - Review Your Order (available at grocery.walmart.com); Dated May 6, 2019, 2 pages.

Enders, Albrecht, et al., "Leveraging Multichannel Retailing: The Experience of Tesco.com," MIS Quarterly Executive, vol. 8, No. 2, pp. 1-12 (Jun. 2009).

* cited by examiner

How was Marc Kapke?

Order total: $29.37

1102

1104

Added tip: $5

Review of Marc Kapke:

1106 Great job!

INTEGRATION OF THIRD PARTY DELIVERY SERVICE INTERFACE INTO ONLINE RETAIL PLATFORM

CROSS-REFERENCE TO RELATED APPLICATIONS

The present application claims priority from U.S. Provisional Patent Application No. 62/768,719, filed on Nov. 16, 2018, the disclosure of which is hereby incorporated by reference in its entirety.

TECHNICAL FIELD

The present disclosure relates generally to methods and systems for providing third party delivery services integrated with a retailer website.

BACKGROUND

The rise of crowd-sourced services has brought a lot of convenience to consumers. Various companies now provide delivery of goods from retailers to consumers in the same day. In particular, many companies recruit people to shop for groceries and deliver those groceries to customers. A customer can access a smartphone application, browse through eligible grocery items, and place an order to have those groceries delivered within a particular time window. The person shopping for the groceries also utilizes a smartphone app to accept the orders, view information about the orders, and complete the orders at a grocery store. The shoppers typically use a payment card to check out at the grocery store. The shopper is later reimbursed for the cost of the groceries and will also receive a payment for completing the delivery. The customer pays the delivery service for the groceries and the delivery fee. The delivery service keeps some of the delivery fee to cover operating expenses and then also pays a portion to the person who delivers the groceries. In some cases, the customer is charged more for the individual grocery items to offset the cost of delivery instead.

These delivery service providers often form mutually beneficial relationships with grocery stores. The grocery stores provide information about their available products. The delivery service brings more business to the grocery store by making home delivery possible for stores that may not already provide grocery delivery services.

In some instances, delivery services go beyond groceries. Additionally, some grocery retailers offer products other than groceries and perishable items. For example, some retailers offer goods that can be sourced from local stores or distant warehouses. The source of the item depends on the type of items. Some items are perishable grocery items that can only be picked up in the store. Some items are available in the store, but are not perishable so delivery is not time sensitive. Some items are bulky or not in high enough demand to be stocked in every store location of a chain retailer. Therefore, there are many ways in which items can be delivered from a retailer to a customer.

Some delivery options include simply having the customer select and purchase items in the store, having a third party same-day delivery service shop for items in the store and then deliver them to the customer within a short period of time, placing an order at a store so that employees select and bag the items and then the customer can quickly pick up the bagged items from the store (either in-store or drive-up service). Customers can also place orders that will be shipped by a carrier from a store or warehouse to the customer's address.

Generally, to place an order for same-day delivery of items from a retail store to a customer, the customer has to place the order directly through a third party same-day delivery service. This has a number of disadvantages. For example, such third party delivery services may not readily be able to deliver the entire inventory held by a particular retailer—this may be because certain items are bulky or not amenable to same-day shipment, or may simply be because the particular item selection and/or inventory at the retailer may change, and therefore the information held by the third party delivery service may be out of date (either in terms of items not being offered through the third party delivery service which are available through the retailer, or based on the item not being in stock at the moment the customer wishes to order). Still further, the customer may simply prefer to place the order directly through the retailer (e.g., based on brand or store loyalty). Additionally, the customer might be purchasing other items from the retailer and wishes to only have to check out online once for all of the items that will be delivered in different ways. The customer might also wish to limit the parties with which the customer shares his or her payment information. The customer might also want to ensure that discounts from the retailer are being applied to his or her order.

For at least these reasons, it is desirable to provide a checkout experience that allows a customer to order perishable items for same-day delivery at the same time as items that can be delivered to the customer by other means. This order is placed directly with the retailer even though a third party same-day delivery service is delivering at least some of the items, thus limiting the need to provide payment information to just one entity.

SUMMARY

In summary, the present disclosure relates to methods and systems for integrating third party same-day delivery options with an online retailer ordering system.

In one embodiment, an ordering system of an online retailer is provided. Thee system comprises a computing system of an online retailer platform including a processor communicatively connected to a memory, the memory storing: data for each of a plurality of product web pages; an inventory data store comprising current product inventory information of the online retailer; and instructions which, when executed by the processor, cause the computing system to: generate a graphical user interface of a retailer website including descriptions of a plurality of items offered for sale by the online retailer, the plurality of items including at least one item eligible for delivery by a third party same-day delivery service provider; receive, from a customer user computing device, a selection of at least one of the plurality of items offered for sale, the selection comprising the at least one item that is eligible for delivery by the third party same-day delivery service provider; retrieve, via an API exposed by the third party same-day delivery service provider, one or more scheduled delivery timeframe options available for delivery of the at least one item; display, within the graphical user interface of the retailer website, the one or more delivery window options associated with the at least one item and the third party same-day delivery service provider; receive, from the user device, a selection of a delivery window option from the one or more delivery window options; and in response to confirming payment information, completing a transaction at the retailer website for the at least one item and transmitting order information to the third party same-day delivery service provider.

A method of presenting an integrated checkout experience on a retailer website is provided. The method comprises: generating a graphical user interface for display on a computing device, the graphical user interface comprising a cart section and an order summary section, the cart section comprising one or more items selected for purchase, the one or more items being grouped into at least two categories based on method of delivery where at least one of the methods of delivery is same-day delivery performed by a third party delivery service provider, the order summary section comprising a total price for the one or more items selected for purchase; displaying one or more delivery window options for items in the category for same-day delivery performed by a third party delivery service provider, the window options being accessed from a third party delivery service provider API; receiving a selection of one of the one or more delivery window options; and completing a single transaction for one or more items.

In another aspect, a non-transitory computer-readable storage medium comprising computer-executable instructions which, when executed by a computing system, cause the computing system to perform a method of presenting a online retailer checkout interface The method comprises: generating a graphical user interface of a retailer web site for browsing a plurality of items offered for sale by the online retailer, each of the plurality of items having a description including an indication of availability in a geographic area and an indication of delivery methods available to deliver the items in the given geographic area; receiving, from a user computing device, a selection for purchase of at least two of the plurality of items offered for sale, the selection comprising at least one item that is available for delivery by a third party same-day delivery service provider in the given geographic area and at least one item that is available for delivery by a delivery method other than delivery by the third party same-day delivery service provider; generating a graphical user interface of the retailer website for placing an order, the graphical user interface including a visual representation of the at least two items selected for purchase; retrieving, via an API exposed by the third party same-day delivery service provider, one or more available delivery time options for the at least one item available for delivery by a third party same-day delivery service provider; displaying, within the graphical user interface for placing an order, the one or more delivery window options associated with the at least one item and the third party same-day delivery service provider; receiving a selection of a delivery time option from the one or more delivery time options; receiving a selection of a delivery method for delivery of the at least one item that is available for delivery by a delivery method other than delivery by the third party same-day delivery service provider, the delivery method being a method that is not delivery by the third party same-day delivery service provider; determining a delivery address for the at least one item that is selected for delivery by the third party same-day delivery service provider; determining a payment method for purchase of the two or more items; displaying a total for the at least two items on the graphical user interface for placing an order; receiving, from the user computing device, a confirmation to place an order for the at least two items; transmitting order information to the third party same-day delivery service provider, the order information including the delivery address and excluding the payment method; receiving confirmation of completed delivery from the third party same-day delivery service provider; and completing a single transaction using the payment method at the retailer website for the at least two items.

In another aspect, an online retailer computing platform is provided. The platform comprises a computing system of an online retailer including a processor communicatively connected to a memory. The memory stores: data for each of a plurality of product web pages; an inventory data store comprising current product inventory information of the online retailer; and instructions which, when executed by the processor, cause the computing system to: generate a graphical user interface of a retailer website including descriptions of a plurality of items offered for purchase from the online retailer, the plurality of items including at least one item eligible for same-day delivery; receive, from a customer user device, a selection to save at least one of the plurality of items offered for purchase in an online shopping cart, the selection comprising the at least one item that is eligible for same-day delivery; display, on the graphical user interface of the retailer website, a checkout page comprising a summary of order information; retrieve one or more scheduled delivery options available for same-day delivery of the at least one item; display, within the graphical user interface of the retailer website, the one or more scheduled delivery options associated with the at least one item; receive, from the customer user device, a selection of a scheduled delivery option from the one or more scheduled delivery options; communicating at least a portion of the order information to a delivery user computing device; receiving confirmation from the delivery user computing device indicating that the order including that at least one item eligible for same-day delivery has been fulfilled; in response to confirming payment information, completing a transaction at the retailer website for the at least one item; and sending a verification to the delivery user computing device, the verification indicating that the transaction is complete.

A retailer integration platform of a same-day delivery service provider is also provided. The platform comprises: a computing system of a same-day delivery service provider including a processor communicatively connected to a memory configured to store instructions which, when executed by the processor, cause the computing system to: receive, from a retailer website at an Application Programming Interface (API), an identification of an item location of an item designated for delivery and a delivery location of a requesting user; providing, to the retailer website via the API, at least one delivery window option available for delivery of the item; receiving, from the retailer website, a confirmed request for delivery of the item; and dispatching a delivery user to fulfill the request for delivery of the item from the item location to the delivery location.

Another aspect provides a method of providing same-day scheduled delivery of an order comprising at least one item. The method comprises: receiving order information from an online retailer platform, the order information comprising a list of requested items, wherein the list of requested items includes at least one item to be delivered by same-day scheduled delivery to a delivery address; communicating one or more delivery options to the online retailer platform through an integration API, the delivery options including at least one scheduled delivery window; receiving a selection of one of the scheduled delivery windows; communicating the order information to a delivery user computing device; receiving an indication that the delivery user has retrieved the requested items; sending confirmation of the completed delivery to the online retailer platform through the integration API; sending an indication of checkout to the delivery user computing device, the indication enabling the delivery user to leave a retail store without providing payment for the items; and receiving payment for completed delivery without receiving payment information from a customer.

A system for integrating third party delivery services with an online ordering web service of a retailer comprises: a delivery service platform comprising a processor communicatively connected to a memory comprising: a delivery data store; an application programming interface; and instructions which, when executed by the processor, cause the delivery service platform to: receive, from a retailer website at an Application Programming Interface (API), an identification of an item location of an item designated for delivery and a delivery location of a requesting user; provide, to the retailer website via the API, at least one delivery window option available for delivery of the item; receive, from the retailer website, a confirmed request for delivery of the item; and dispatching a delivery user to fulfill the request for delivery of the item from the item location to the delivery location.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 16 illustrates another view of the graphical user interface of FIG. 13, showing confirmation of coexisting shipments via a same-day delivery service and a second delivery service.

DETAILED DESCRIPTION

Figure 1:
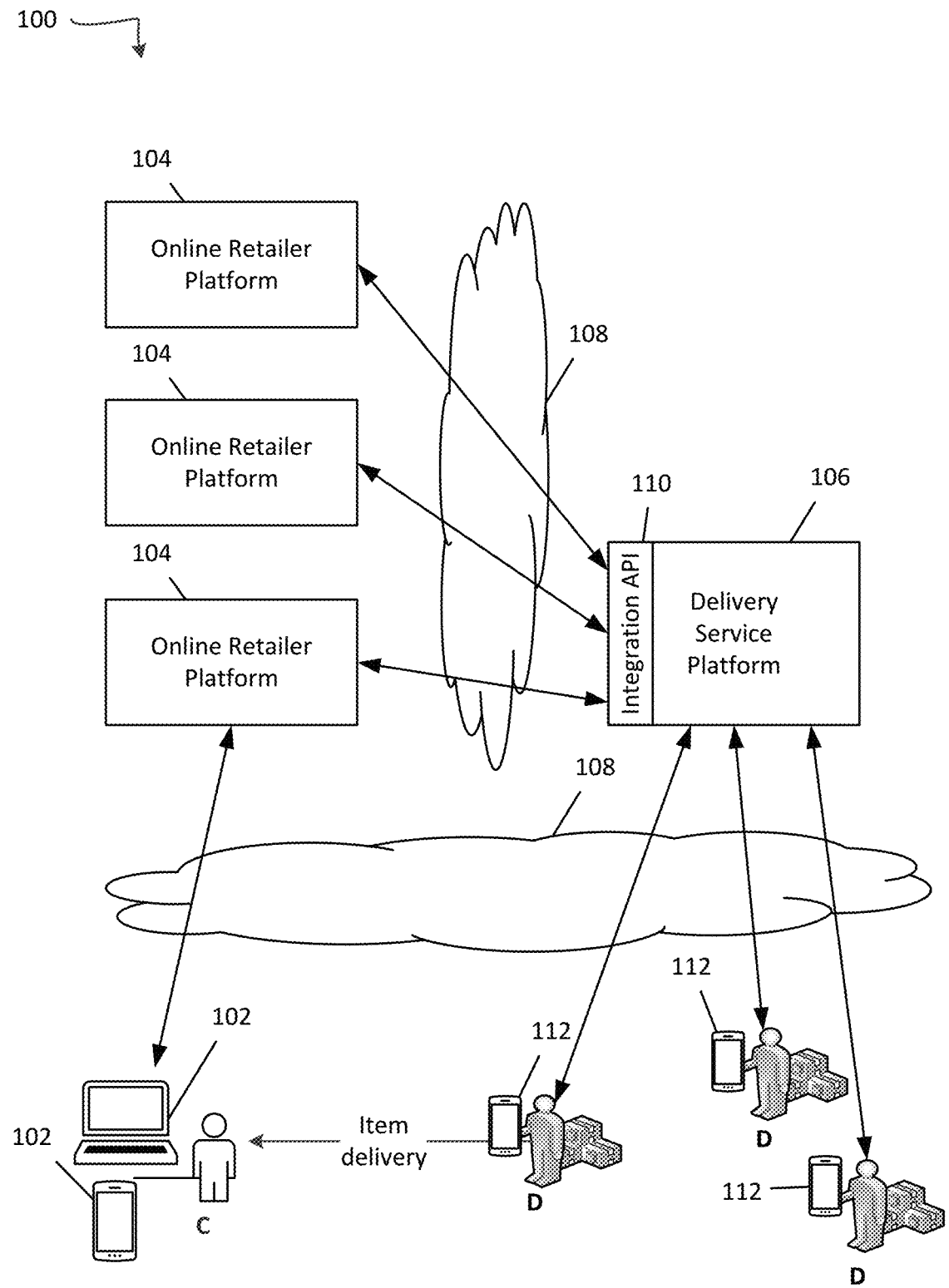
FIG. 1 illustrates a schematic diagram of a system for integrating a third party delivery service with a retailer website.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure describes systems and methods for integrating a third party same-day delivery service with a retailer website. A customer selects items for purchase from a retailer using a website displayed on a web browser or a computing application configured to access and display information from the website. The customer accesses the retailer's information using a network enabled computing device such as a desktop computer, laptop computer, tablet, or smartphone.

In example implementations, each item offered by a particular retailer is described on the retailer website where the description includes a price and available methods of delivery. The methods of delivery can be determined by characteristics of the item as well as the availability of the item in proximity to a delivery location specified by the customer. The customer can select two or more items for purchase in the same transaction, even if the items are sourced from different locations or are delivered by different methods of delivery.

The customer can view items selected for purchase in an online shopping cart. The online shopping cart displays item information including available delivery methods. For items that have more than one delivery method option for the given delivery location, the user can select a preferred delivery method. The retailer website may select a default delivery method for each item. Some items may be selected for delivery by a third party same-day delivery service provider. Delivery options for third party same-day delivery of those items are displayed within the online shopping cart. The delivery options include at least one delivery window, specifying a particular range of time in which delivery to the customer address will take place. These delivery windows are accessed from an application programming interface (API) of a third party same-day delivery service provider. In some instances, the third party same-day delivery service provider can be a crowdsourced delivery service provider.

In use, a customer first accesses an online shopping portal associated with a retailer. The online shopping portal can be accessed via a website or via an application. The website can be viewed on a computing device using a browser. The website can be used to browse through items available for sale by the retailer. The application can display the same set of items, but are accessed through an application on a portable computing device.

The retailer website can offer a variety of items for sale. Some items may be perishable items such as groceries. Other items may be shelf stable items such as non-perishable groceries, home goods, clothing etc. Depending on the nature of the items, different means of delivering the items to a customer are available. For example, a TV may be available for in-store pickup or by shipping to the customer. Alternatively, a banana may be available for in-store pickup or same day delivery. The same day delivery can be performed by a third party same-day delivery service. In some embodiments, the third party same-day delivery service is performed by crowdsourced users. In some embodiments, the same-day delivery service is not a third party, but instead is a subsidiary of the retailer or the same entity as the retailer. For same-day delivery performed by the same entity, the delivery users can be employees or independent contractors.

Once the user (customer) has accessed the website or application, the user can begin to browse items available for sale. There are various ways that the items can be presented to the user. In one example, the user browses by categories. Such categories may be things like groceries, clothing, electronics, and furniture. The user can also filter items by key words or characteristics. Combinations of categories and characteristics can be used to narrow down the items.

In the case of groceries, the available items could be browsed in such a way as to mimic the process of walking through aisle of a grocery store. For example, all of the produce may be collected together into one category or aisle. Then all of the items that would be found at the meat counter are grouped together. This allows a user to more easily navigate available grocery items as the use can think through a typical grocery shopping session as if they were actually shopping at a physical store.

As the user is browsing, items can be selected to display item information pages that include additional details about the items. Such information can include availability, when the item can be shipped or picked up, price, brand name, and the like.

The user can select items to add to a shopping cart. The cart can be associated with a particular user account. At some point while using the retailer website, the user could login into an account or establish a new account. The account can include location information and payment information for the customer user. To determine availability of items without an account, a user could simply enter a zip code or select a preferred store location.

Once the user selects some items, they are added to the shopping cart. The user can make some selections to determine how and when the items are delivered to the user. Delivery can refer to delivery by shipping carrier, same-day delivery by a service, or a customer picking up a prepared order at a retail store. Other methods of delivery are possible, such as crowd-sourced delivery performed by other customers or employees, etc.

Scheduled delivery options are presented to the customer user on cart or checkout page of the retailer website. The delivery options are populated from data received from a third party same-day delivery service provider through an API. The data can be displayed in such as way as to blend in with the visual appearance of the cart or checkout page of the retailer. In some embodiments, some visual elements are displayed with the delivery options, where the visual elements are derived from the third party same-day delivery service. Such visual elements could include a logo or name of the third party delivery service. In some embodiments, other visual elements associated with the third party delivery service such as colors or patterns could be incorporated into the cart/checkout page.

In the example implementations, the items added to a shopping cart can be assessed by the retailer web site. If items are included in the shopping cart which are perishable and may be delivered by a same day delivery service, an application programming interface (API) can be used to transmit user and item information to the third party delivery service. Based on delivery user availability, information may be provided to the retailer web site regarding delivery windows and delivery preferences, which can in turn be displayed to the customer within the user interface of the retail web site. Concurrently, if items are included in the shopping cart which are not perishable or are not eligible for same-day delivery, those items may be handled separately by other delivery means. However, the customer may execute a check out operation on all items concurrently, and effect payment within the website.

Continuing this example discussion, a delivery person may visit a retail location to select and pick up items that are designated four same-day delivery. In some instances, because payment for the selected items was previously made by the customer, the delivery person can, advantageously, simply select the relevant items and leave the retail location without having to wait in a checkout line or otherwise execute a second payment process for those items. In such instances, the delivery person may only be required to consult with a store employee to validate the items selected by the delivery person against a manifest shared by the retailer and the third party delivery service.

In accordance with the following disclosure, the systems and methods provided herein have a number of advantages. For example, the customer will have a typical online shopping experience at the retail web site of his or her choosing, while the third party delivery service can receive only the items selected for same-day delivery from among the overall selection of items made by the customer. In other words, the third party delivery service may not need to be capable of delivering all of the items offered online by the retailer. The customer may be displayed information or options required by the third party delivery service such as delivery windows or delivery options, but the customer experience will be as if the customer is interacting only with the retail web site. This ensures that the customer will be presented with an updated list of items available from the retailer, as well as updated inventory information about those items, which would otherwise not likely be available if the customer were required to select items at a third party delivery service's website for pickup at the retailer. Still further, the customer only is required to execute a single check out operation, rather than separate check out operations for both same-day delivery and items that are shipped using other carrier options.

Still further, the third party delivery service may expose an API accessible to the retail website. This has the advantage allowing the third party delivery service to seamlessly integrate with any of a number of different retail web sites, and allowing those retail web sites to pass through and display information from the third party delivery service to customers of that retailer. This increases the overall frequency of use of the third party delivery service, as well as both simplicity of use to the customer, and simplicity of use to the delivery the user, who does not have to perform a secondary check out operation when fulfilling the customer's order.

FIG. 1 illustrates a schematic diagram of a system 100 for integrating a third party delivery service with a retailer website. The system 100 operates to provide items for sale and delivery to customer users C, where delivery can be performed by delivery users D associated with a third party same-day delivery service provider. The system 100 includes at least one customer user computing device 102 operable to access one or more online retailer platforms 104. The one or more online retailer platforms 104 operate to provide web based portals accessible by the customer user computing device 102 to browse available items for purchase. The online retailer platforms 104 communicate with at least one delivery service platform 106 through a network 108 and an integration API 110.

Items are selected for delivery by one or more delivery modes including same-day delivery performed by a third party service provider. Order information regarding items eligible and selected for third party same-day delivery is communicated to the third party delivery service via the integration API 110 which processes the information for receipt by the delivery service platform 106.

The delivery service platform 106 is operated by a third party same-day delivery service provider. In some embodiments, the third party is associated with, owned by, or owns one or more of the online retailer platforms 104. Such service provider can employ contract delivery users D to perform deliveries. In some instances, the service provider utilizes crowd-sourced delivery users D to complete deliveries based on communications with a smartphone application that are sent through a network 108. The delivery service platform 106 operates in conjunction with an integration API 110 which moderates sending and receiving of data with online retailer platforms 102.

The network 108 allows for communication between one or more computing devices in the system 100. The network 108 can be a wired network or a wireless network such as the Internet.

After receiving order information via delivery user computing device 112, delivery users D perform deliveries of items from a physical retail location to a customer delivery address associated with a customer user C. The delivery user computing device 112 can be utilized to access order information, provide confirmations, communicate with customer users C, and receive confirmations and payments. The system 100 of FIG. 1 is described in further detail with respect to FIGS. 2-8.

Figure 2:
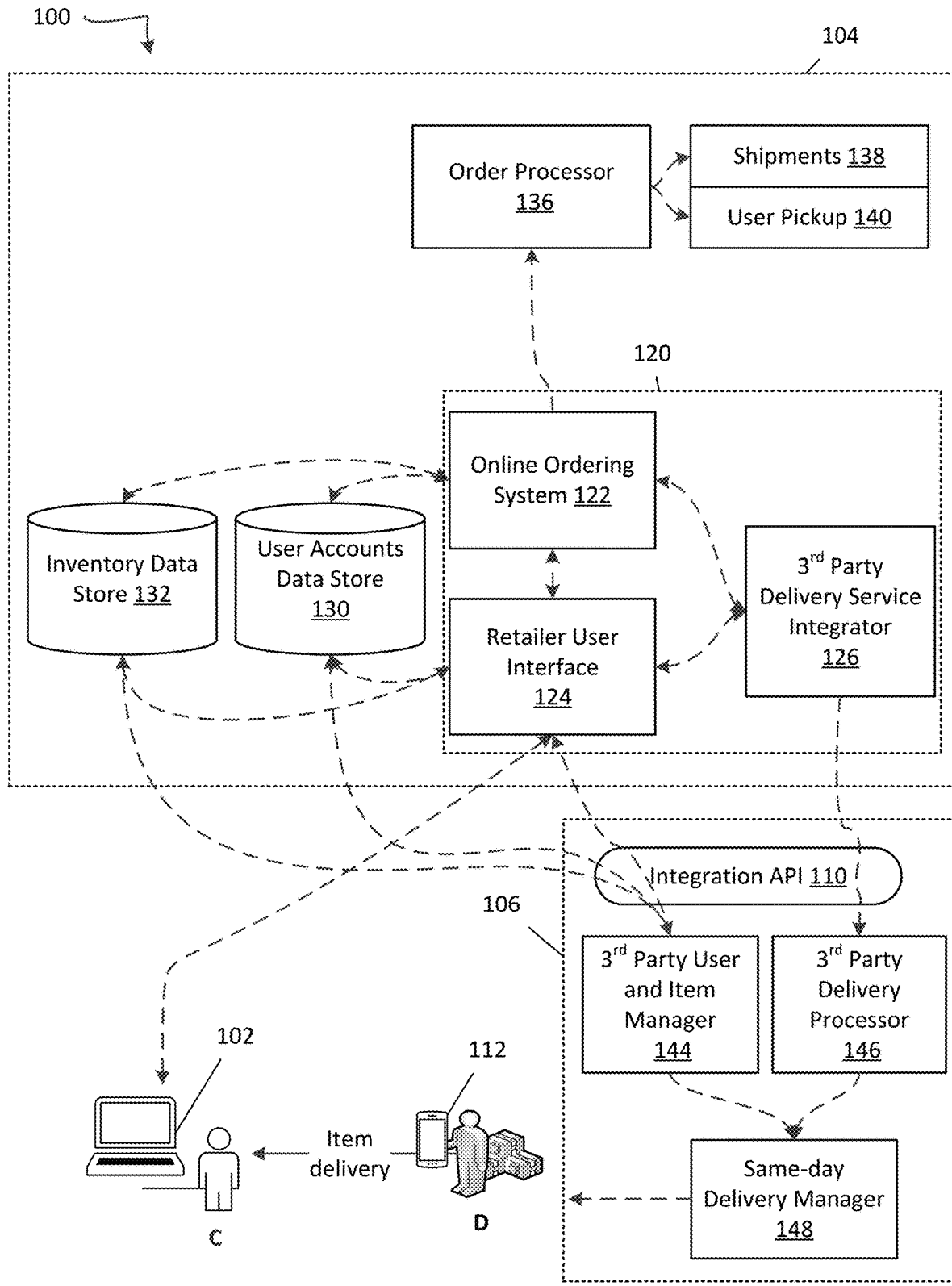
FIG. 2 illustrates a detailed block diagram of the system of FIG. 1.

FIG. 2 illustrates a more detailed schematic diagram of the system 100 of FIG. 1. This schematic is simplified to illustrate functionality of a single customer user C operating a customer user computing device 102 to access a retailer user interface 124 to place an order including items to be delivered by a single delivery user D associated with a third party same-day delivery service provider.

The online retailer platform 104 includes an online ordering system 120. The online ordering system 120 includes an online order handling system 122, a retailer user interface 124, and a third party delivery service integrator 126.

The online ordering handling system 122 operates to receive orders placed through the retailer user interface 124 from a customer user computing device 102. The online ordering system 122 accesses information from the user accounts data store 130 and inventory data store 132 that is needed to complete an order. The information gathered by the online order handling system 122 is processed and delivered to the order processor 136 and third party delivery service integrator 126. Such information can include delivery addresses, payment information, and item availability.

In some embodiments, customer payment information is not provided to the third party delivery service integrator 126, and therefore not provided to the third party at all. Rather, the third party delivery service can be separately paid for the delivery of items to the customer, but may not be exposed to payment details for at least a portion of the items selected by that customer of the retailer. In such an arrangement, the delivery user may only be presented with a list of items requested by the customer for fulfillment, rather than pricing information.

The retailer user interface 124 operates to present a graphical user interface on a website or application hosted by the retailer. The GUI can be shown in different views or pages having different functions. For example, the GUI can present one page for browsing items, individual pages for each item, a page for an online shopping cart, and a one or more pages for the checkout process. The retailer user interface 124 is further described with respect to FIG. 3.

The third party delivery service integrator 126 operates to mediate communication and transfer of data between the online retailer platform 104 and the third party delivery service platform 106. The third party delivery service integrator 126 determines which information from the retailer needs to be communicated to the third party delivery service platform 106. The third party delivery service integrator 126 draws information from the retailer user interface 124 and online ordering system 122. The information is then communicated through the integration API 110 to the third party delivery processor 126. This information is utilized by the third party delivery service to complete same-day, scheduled delivery of orders. In some embodiments, the delivery is not same-day because the customer schedules delivery for one or more days after placing the order. Same-day delivery refers to orders that are packed and delivered in the same day.

The online retailer platform 104 further includes a user accounts data store 130, an inventory data store 132, and an order processor 136.

The user accounts data store 130 operates to store user account information for customers of the retailer. Generally, a user may be required to set up an account in order for information to be stored about a particular user. The user can then login to the user account to access saved information relevant to use of the retailer website. The user accounts data store 130 is described in greater detail with respect to FIG. 6.

The inventory data store 132 operates to store information about available inventory offered for sale by the retailer. The inventory data store 132 tracks the current available inventory at a number of retailer locations including warehouses and store. The inventory data store 132 is described in greater detail with respect to FIG. 7.

The order processor 136 operates to process orders or portions of orders for items that are to be delivered by methods other than third party same-day delivery. In the example of FIG. 2, these other delivery methods are shipments 138 and user pickup 140. The order processor 136 determines which items are to be fulfilled by shipments 138 and those items are processed for fulfillment at one or more retail locations such as warehouses. The order processor 136 also determines which items are to be fulfilled by user pickup 140 at a store and those items are packaged for pickup at a particular retail store. The order processor 136 is described in further detail with respect to FIG. 4.

The third party delivery service platform 106 includes the integration API 110 as well as a third party user and item manager 144, a third party delivery processor 146, and a same-day delivery manager 148. The third party delivery processor 146 receives order information from the third party delivery service integrator 126. Some of this information is forwarded to the same-day delivery manager 148 which operates to communicate necessary order information to delivery user computing devices 112. The third party user and item manager 144 communicates via the integration API 110 with the inventory data store 132 and user accounts data store 130 of the online retailer platform 102. The third party delivery service platform 106 is described in further detail with respect to FIG. 5.

In use, after a delivery user D receives the necessary order information on the delivery user computing device 112, the delivery user travels to a retail location, retrieves the requested items, and delivers those items to the customer user C. Various confirmations can be sent and received at the delivery user computing device 112 and customer user computing device 102.

In some embodiments, the delivery user D will select the requested items from shelves at a retail location. This may be particularly the case where the delivery user D is dispatched via a crowdsourced delivery service. In such embodiments, the delivery user D may not be presented with pricing information for the items retrieved from the retail location, but may instead scan those items at the retail location to confirm receipt. In some embodiments, the delivery user D may not need to be processed at a point of sale at the retail location. In other embodiments, the delivery user D may simply need to be validated by a retail employee anywhere within the store, to indicate that the delivery user D has only selected the correct items requested by the customer (e.g., by visual inspection of items selected by the delivery user D or comparison of scanned items to a manifest held by the store and issued by the order processor 136). In such instances, the process experienced by delivery user D is simplified, since he/she does not also need to handle payment for items, since payment information is not provided to the third party delivery service. Rather, settlement funds and tips are managed by the retailer and passed back through to the third party delivery service. This has the further advantage of simplifying the data that needs to be tracked by the third party delivery service, e.g., by limiting the payment details and secure customer information that are stored.

Figure 3:
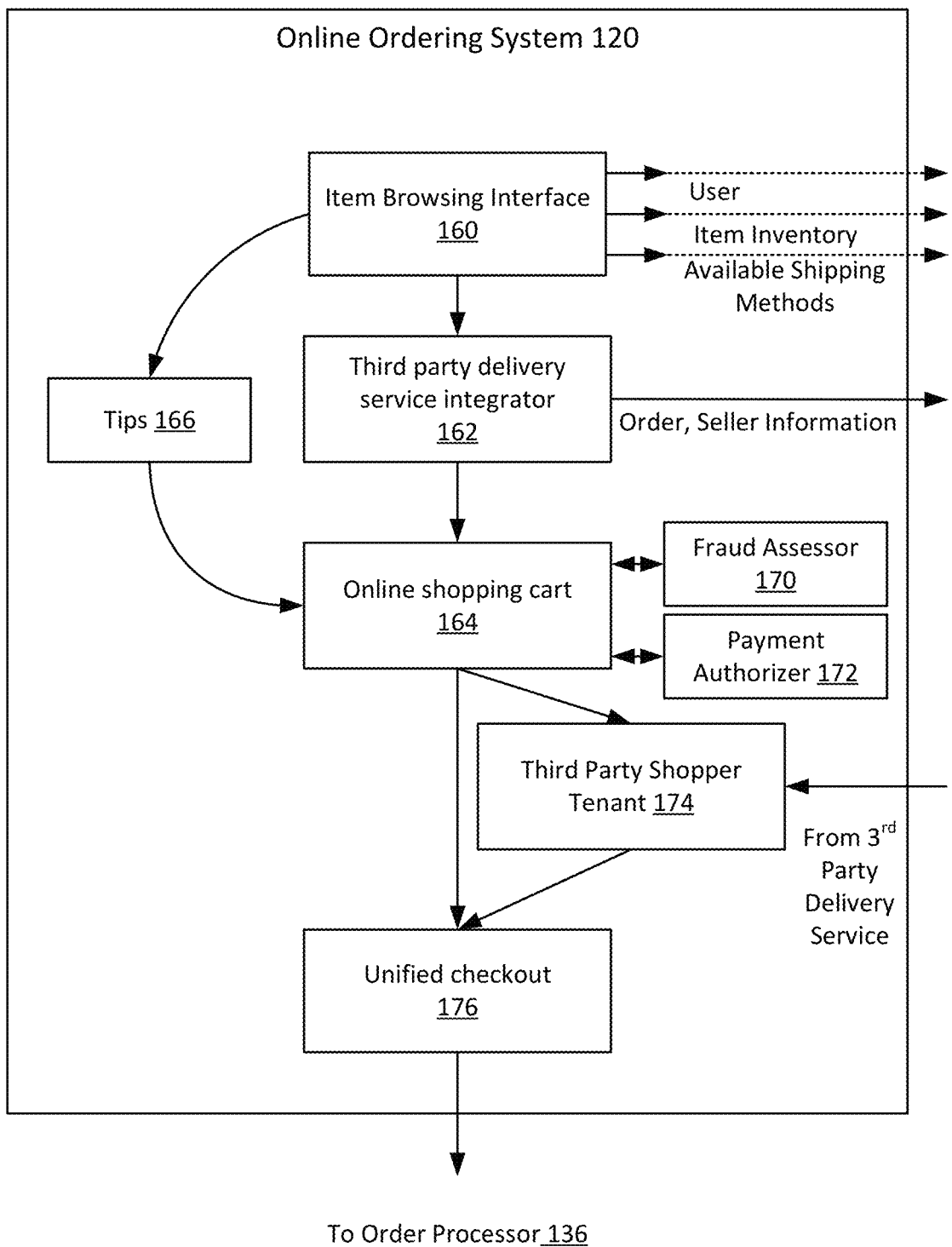
FIG. 3 illustrates a detailed block diagram of the online ordering system of FIG. 1.

FIG. 3 illustrates a more detailed schematic diagram of the online ordering system 120. The online ordering system 120 operates to present different views or pages of a graphical user interface (GUI) to a customer via a customer user computing device. The GUI provides various functionalities and options for user interaction to place orders for purchase and delivery of items provided for sale by a retailer.

The online ordering system 120, as noted above includes a retailer user interface 124 (as seen in FIG. 2), which is presented to a user via an item browsing interface 160, online shopping cart 164, and unified checkout interface 176, details of which are described further below. The retailer user interface 124 can be presented on a display of a customer user computing device 102. The retailer user interface 124 may have a different appearance depending on the size of the display of the customer user computing device 102. For example, the retailer user interface 124 might have a more detailed appearance when displayed on a desktop or laptop computer. The retailer user interface 124 might have a more simplified appearance when displayed on a mobile device or tablet so that a user can more easily navigate the options displayed. The retailer user interface 124 provides graphical and textual display elements that a user can interact with to navigate through a retailer website. The user can obtain information about items provided for sale by the retailer, access a user account, check order statuses, and purchase items from the retailer. A method of receiving selections of items from a customer through the retailer user interface 124 is described in more detail with respect to FIG. 9.

The online ordering system 120 in the example of FIG. 3 includes an item browsing interface 160 configured to display images and text descriptions of items available for sale through the retailer website. Information presented by the item browsing interface 160 includes availability of items and available delivery methods by which a customer could receive items purchased from the retailer. The item browsing interface 160 accesses such information from the inventory data store 132 (FIG. 2).

In some embodiments, the item browsing interface 160 operates to present available items for sale from the retailer in a graphical display that organizes the items in a manner similar to the way in which the items might be displayed in a physical retail store. In one example, the items may be organized such that one "aisle" of items is displayed as a horizontal arrangement of items that can be scrolled through left or right. Then the next aisle is located above or below the first aisle. The aisles can be arranged in a similar relation to each other as they would be in a physical store. For example, the fruit aisle might be next to the vegetable aisle, similar to the way the produce section of a grocery store would be arranged.

The item browsing interface 160 receives selections of items by any user, and passes user, item inventory, and available shipping method information to a data store, which can also be passed to a third party delivery service (e.g., via an API of that third party delivery service).

A third party delivery service integrator 162 displays delivery options that are specific to a particular third party delivery service, e.g., for items that can be delivered using the particular shipping method for which that delivery service is applicable. For example, different delivery services might provide different lengths of delivery timeframe windows, offer delivery at different dates and times of day, and charge different delivery fees. In the example shown, where an item may be associated with a same-day third party delivery service (e.g., a crowdsourced delivery service), the third party delivery service integrator 162 can pass order and seller information to the third party delivery service, so that delivery service can return (e.g., to a third party shopper tenant 174, described below) relevant information to delivery of those items. Additionally, graphical displays specific to a third party delivery service can be displayed on the website. The third party delivery service integrator 162 can access data provided by a third party delivery service to customize a delivery options display to the particular third party delivery service by using the third party delivery service's logo, colors, and fonts.

Accordingly, because the item browsing interface 160 and the third party delivery service integrator 162 gather user, item inventory, shipping method, and both order and seller information, that collection of information can be used by a third party delivery service to determine (1) the retailer at which to acquire items for delivery, (2) the items for delivery, and (3) the user to whom delivery is requested (including a default address for delivery).

In the embodiment shown, the online shopping cart 164 presents information about items selected by a customer, and shipping options for a customer order. The items selected for purchase are organized into an online shopping cart which tracks which items, options, and quantity that a user has selected for purchase. The available options for delivery of the items to the customer are displayed. In some embodiments, the items are organized visually based on the selected delivery mode. The prices of the items and the total for the order can be displayed. The online shopping cart engine 164 accesses information about the items from the inventory data store 132. Information about available shipping options is accessed by the online ordering system 122 from various databases (not shown). In some embodiments, the online shopping cart engine 164 accesses address and payment information for a customer user from the customer user's account, which can be stored in the user accounts data store 130.

In the embodiment shown, the online shopping cart 164 is integrated with a fraud assessor 170 and a payment authorizer 172. The fraud assessor 170 operates to analyze information received at the online shopping cart 164. This analysis flags users and transactions that are deemed high risk for fraudulent activity. The payment authorizer 172 operates to check payment information and determine that payments can be made. Payments can be authorized for items ordered as well as tips paid to delivery users. In example embodiments, the payment authorizer 172 pre authorizes payment in excess of the total cost of the items (e.g., 125% of total cost) in the online shopping cart 164 to account for possible variance when the third party delivery service obtains the selected items from the retailer. Accordingly, based on selection of same-day delivery items, a pre-authorization process may occur in which payment is authorized prior to it being fully processed (e.g., by order processor 136, below).

The tips 166 function operates to receive input from customer users at the item browsing interface 160 indicating that an additional tip should be paid to a delivery user. This is communicated to the online shopping cart 164 where the payment is processed by the payment authorizer 172.

The online shopping cart 164 also communicates with a third party shopper tenant 174 and a unified checkout 176. The third party shopper tenant 174 receives communications from a third party same-day delivery service, which can include, for example, information about possible order times or other options. For example, based on the items presented in the online shopping cart 164, the third party delivery service may provide to the retailer user interface 124 one or more time windows for delivery of the selected items as well as one or more options for selection of items (e.g., how to handle substitutions of items where certain items may not be available).

In some embodiments, in coordination with the third party shopper tenant 174, a graphical user interface (GUI) is displayed within a shopping cart or checkout page of a retailer website. Data is received from a third party delivery service provider to customize the GUI. The GUI can be customized to include logos, colors, and other visual themes associated with a third party delivery service. The GUI displays options for delivery that are specific to the third party delivery service. For example, the retailer user interface 124 accesses information from the third party service provider about available delivery windows and presents a visual representation of those available delivery windows on the retailer website.

The unified checkout 176 operates to enable a single checkout process for multiple items even when the items are being delivered by different methods. For example, a single order could include items for third party same-day delivery as well as items that will shipped by a parcel carrier for delivery two days later. The single order could also include items that the customer will pick up at a retail store. The order is paid for with a single charge to a single payment method.

The unified checkout 176 accesses information from user accounts, item inventory, etc., to determine whether to apply discounts to an order. For example, a discount provided by the retailer to employees could be applied to all items in an order, even if the items are being delivered by a third party delivery service. In another example, a discount provided to customers that use a credit card associated with the retailer could be applied to an order that is paid for with that credit card, even if a third party service provider is actually completing delivery. The unified checkout 176 sends order information to the order processor 136 once checkout is complete.

Figure 4:
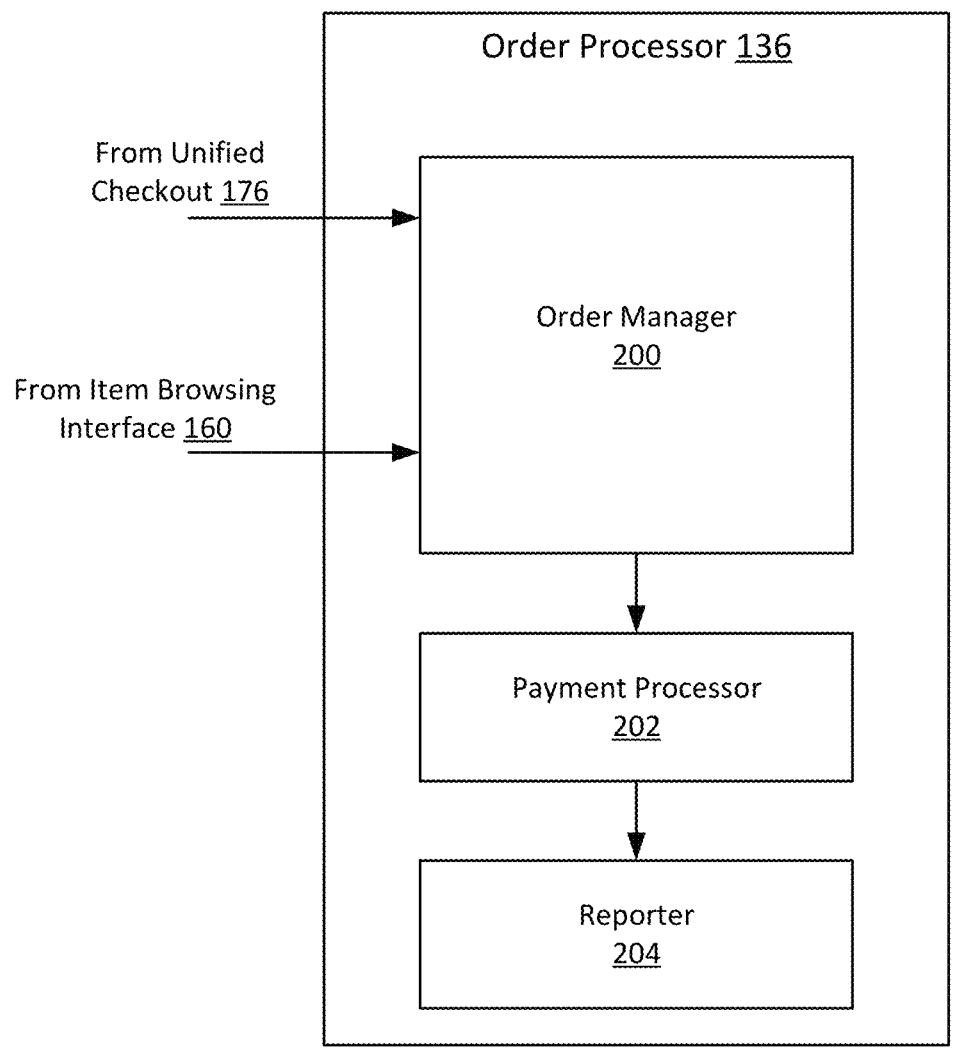
FIG. 4 illustrates a detailed block diagram of the order processor of FIG. 1.

FIG. 4 illustrates a detailed block diagram of the order processor 136. In the embodiment shown, the order processor 136 includes an order manager 200, a payment processor 202, and a reporter 204.

The order manager 200 receives data from the unified checkout 176 and item browsing interface 160. The unified checkout 176 sends information to the order manager 200. The order manager 200 then processes the order information to communicate instructions to other systems to prepare and/or ship items in the order. The order manager 200 also communicates payment information associated with the order to the payment processor 202. The payment processor 202 processes payment using the payment information for an amount provided in a total price for the order, which is received from the unified checkout 176. Finally, the reporter 204 operates to produce reports that can be consumed by systems and users within a retail supply chain. The reports can be used to analyze sales made through a retailer's website.

Figure 5:
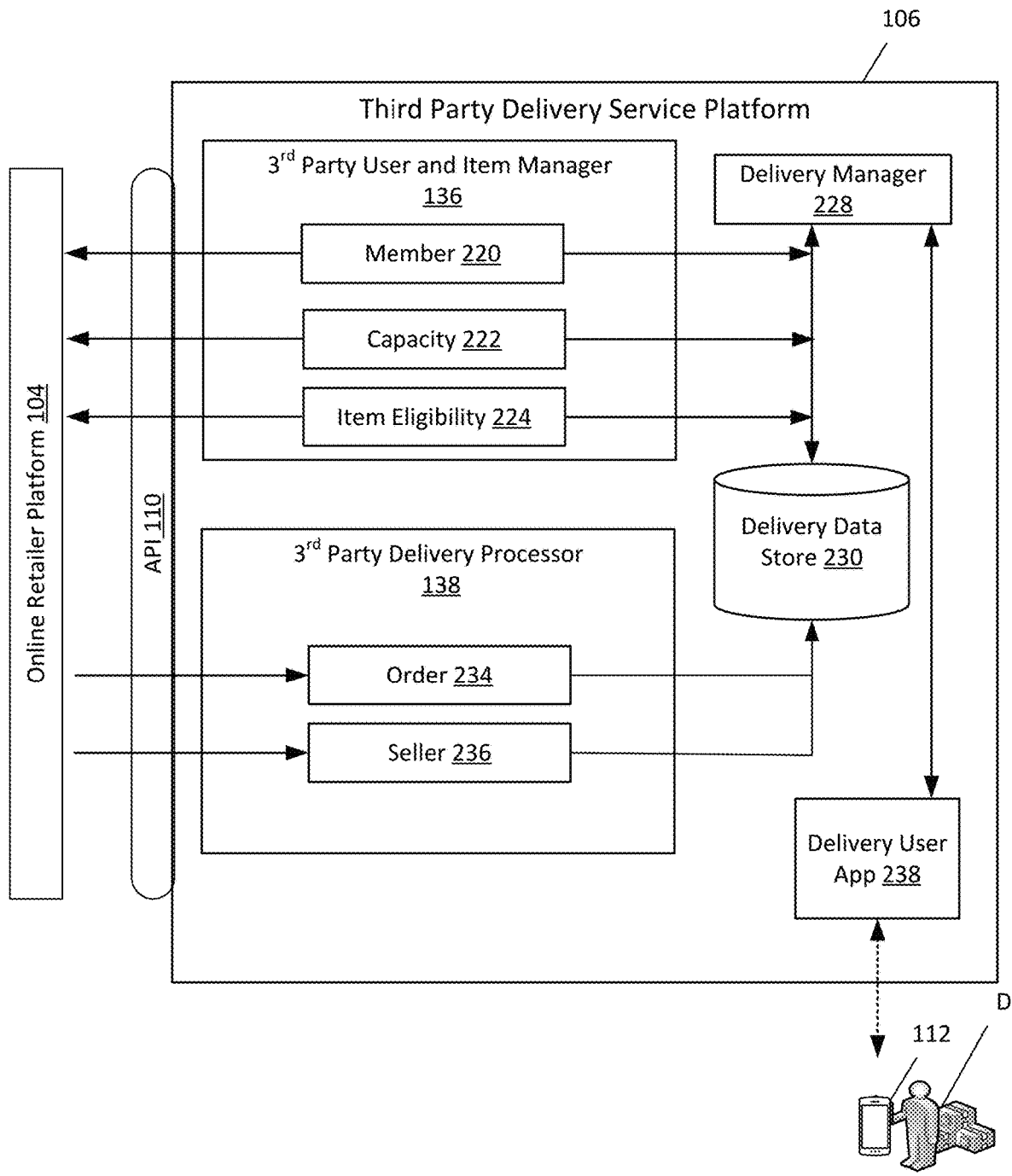
FIG. 5 illustrates a detailed block diagram of the third party delivery service platform of FIG. 1.

FIG. 5 illustrates a detailed block diagram of the third party delivery service platform 106 of FIG. 1. The third party delivery service platform 106 operates to coordinate the offerings of a third party delivery service with a retailer website. This is accomplished in part with the aid of the API 110 which mediates communications between the third party delivery service platform 106 and the online retailer platform 104.

The third party user and item manager 136 operates to manage data received from a retailer, such as one managing online retailer platform 104. Different types of data are processed including member data 220, capacity data 222, and item eligibility data 224. Member data 220 generally corresponds to data associated with users who are either (1) already known to the third party delivery service or (2) new users who have selected to receive a delivery to be made by the third party delivery service (e.g., those users who may become new users). Capacity data 222 relates to the capacity of the third party same-day delivery service to complete deliveries of orders in a given time and place. Item eligibility data 224 indicates criteria for items to be delivered by the third party same-day delivery service provider. Such criteria may be based on, for example, the items elected to be made available for delivery by the third party delivery service (e.g., items eligible for same-day delivery).

In some instances, because order information is initially received at the online retailer platform 104, the online retailer can determine which items (i.e., all items, or fewer than all items). As such, only item information for those items which may be eligible for shipment via the third party delivery service will be passed to the third party delivery service. However, in some instances, eligibility may be defined by a determination performed at the online retailer platform 104 or based on item eligibility data at the third party delivery service platform 106.

In the example embodiment shown, the third party delivery processor 138 communicates order data 234 and seller data 236 to the delivery data store 230. This data is utilized to complete order information. The data is communicated to delivery users D via a delivery user application 238.

The order data 234 can include as little as a list of items to be acquired and shipped to the user. For example, the order data 234 can include item identifier data, arranged in the form of a digital receipt. In example embodiments, the list of items may include item descriptions, quantities, and characteristics of items (such as size, brand, etc.). The pertinent information can also include a delivery address, and the requested delivery timeframe, and a retail store address. In some embodiments, the third party delivery service is also provided with substitution instructions and other delivery instructions provided by a customer in their same-day delivery order. In some embodiments, the pertinent information further includes a cell phone number so that the shopper can contact the customer to ask about substitutions or provide updates on the order progress. In example implementations, some or all of this information may be provided to a delivery user D for interaction with a customer user (e.g., in the event of variances that are required due to items being out of stock, or other preference information that may need to be communicated between the customer user and delivery user.

The seller data 236 includes information about the retailer and location where the items are to be picked up. This can include, for example, an identification of a retail location selected by the user (e.g., a store from which a shipment will originate) as well as an address of the retail location.

The delivery manager 228 operates to receive data about incoming orders and arrange for deliveries to be completed by delivery users D. The incoming order data is drawn from the delivery data store 230. The delivery manager 228 coordinates delivery via the delivery user app 238, which is installable on any of a number of user devices of delivery users D. In use, the delivery manager 228 will, in response to receipt of order data 234, identify one or more delivery users D who are available to respond to the delivery. Delivery users available for responding to a delivery may be determined based on delivery users within a predetermined area who have responded as available to handle deliveries. Additionally, delivery users may be filtered or selected by using a predetermined proximity to the retail location and/or delivery address of the customer user. The delivery manager 228 can then determine, for example which one of the delivery users should be assigned to the order based on, for example, ratings of the delivery user, complexity of the order, or other rating or prioritization systems.

The delivery data store 230 stores all data managed by the third party delivery service platform. For example, the delivery data store pertaining to incoming orders as well as information relating to users and items. Some data in the delivery data store 230 is gathered from incoming orders. Other data is created by the third party same-day delivery service, e.g., for managing delivery services by crowd-sourced delivery users.

In some embodiments, the delivery data store 230 includes static inventories from retailers that a given third party delivery service offers deliveries from. The database is populated with available items that are offered for delivery from one or more retailers. The inventories can be specific to a particular store location or to a particular retail chain. The retailer inventories can be updated on a regular basis or whenever the retailer provides an update. In some instances, the inventory of available items for a retailer might include fewer items than are actually available for sale at a particular retail store due to other restrictions that prevent the third party delivery service from offering delivery of those items.

In some embodiments, the delivery data store 230 includes information for delivery users or shoppers that work for a third party delivery service. The third party delivery service could operate using contract workers in a model that might be described as "crowd-sourcing." The delivery users may go through a vetting and enrollment process to join the delivery network. The third party delivery service provider then operates to coordinate deliveries with available delivery users based on their proximity to retail stores and customers. The delivery data store 230 includes information for each delivery user such as location, contact information, availability, etc. In some instances, the information could include proof of driver's license, proof of insurance, tax forms, etc.

The delivery user application 238 generates a graphical user interface for display on delivery user computing devices 112. In particular, the GUI generated for delivery users could be designed to be displayed on a mobile computing device for use with a computing application. The GUI for delivery users displays such information as the list of requested items for an order, a delivery time window, the address of a retail location where the items are be picked up, and a delivery address. In some embodiments, the delivery user application 238 also provides for messaging functions to communicate with customers regarding updates for same-day delivery orders. For example, the delivery user D could communicate with the customer user C regarding an unavailable item and how to go about substituting the items.

The delivery user application 238 operates to present a graphical user interface on a delivery user computing device 112. The graphical user interface includes features to aid a delivery user D in selecting items at a retail store to fulfill an online order of a customer C placed through the retailer website. The GUI can also operate to allow a delivery user D to check out using the delivery user computing device 112 and skip checking out at the retail store.

In some examples, the delivery user application 238 also operates to mediate communications between a delivery person and a customer. Such communications could be made through a computing application that includes a messaging features. The messaging can be associated with, for example, modifications that may be made to the order based on a change in inventory at the location where items are picked up from a retailer for delivery.

Various graphical user interfaces (GUIs) can be generated by the delivery user application 238.

A shopping list viewer operates to display a list of items for each order. The list of items includes descriptions of the requested items including quantity and other characteristics such as size and color. In some instances the list can include particular brand names for the items. The list might also include visual representations of each item.

A summary checkout screen can be displayed on the delivery user computing device 112 after a delivery user has collected all of the requested items for a given order. The delivery user can checkout by confirming that all items are collected and then the items will be paid for by the customer. The GUI then displays a confirmation of checkout on the delivery user's mobile computing device.

In some embodiments, a barcode is generated that can be scanned by an employee of the retail store to confirm that the items have been paid for. In some instances the employee can be presented with a short list of representative items from the order to do a visual inspection of the contents to ensure that the items that the delivery user is leaving with match up with what was paid for.

In some embodiments, a GUI is displayed to a delivery user for viewing available orders that are waiting to be claimed for delivery. In some embodiments, the GUI automatically narrows down the available orders to those within a given geographic area of the delivery user. In other embodiments the user can search by store location or by a general area for deliveries. In some embodiments, the delivery user can then select an unclaimed order to initiate the delivery process.

Figure 6:
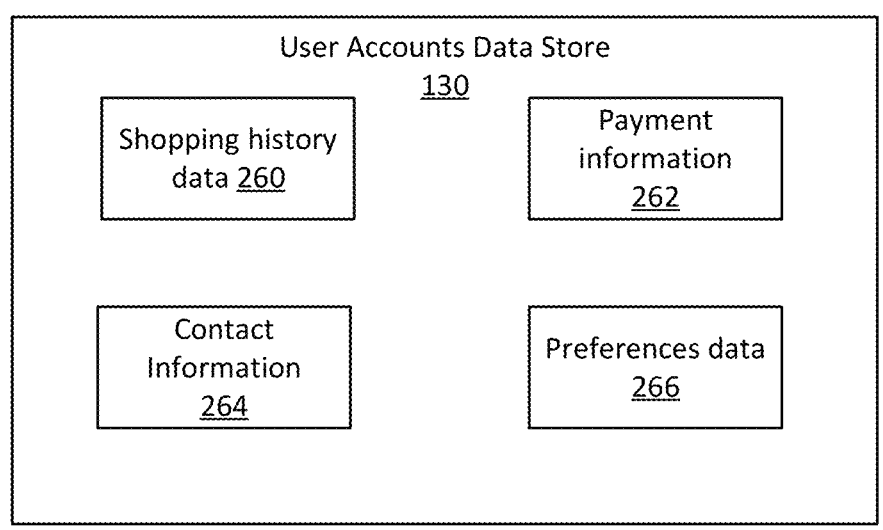
FIG. 6 illustrates a detailed block diagram of the user accounts data store of FIG. 2.

FIG. 6 illustrates a detailed block diagram of the user accounts data store 130 of FIG. 1. The example user accounts data store of FIG. 6 includes shopping history data 260, payment information 262, contact information 264, and preferences data 266. Information in the user accounts data store 130 can be used to by the online ordering system 122 to facilitate completing orders more quickly.

The shopping history data 260 includes information about previous browsing activity and orders placed by a particular user. A user can log into a user account on a retailer website. Browsing activity on the retailer website can be saved in association with the user account. This browsing activity can be used to inform recommendations and promotions that are presented to the user. Previously placed ordered can also be saved in association with the user account. This information can be accessed by the user later through a user account page. The user can access precious orders to review receipts, initiate returns, and leave feedback. Previous order information can be used to suggest repeat orders and make it easier for a user to browse items that the user has purchased in the past. The shopping history data 260 can also save preferences for retail stores that the user has shopped at or picked up order from in the past.

The payment information 262 includes information about methods of payment. A user can save payment information in a user account for use in placing future orders. For example, a user could place a first order and enter information for a credit card. That credit card information can be saved and auto-populated during checkout for a second order. In some instances, a payment method can have discounts and perks associated with its use. By saving that payment method in a user's account, the user can access those discounts and perks whenever the user is logged into the retailer website. The stored payment information 262 can also be used to fund tips that are entered by a customer to be provided to a delivery person who delivers same-day orders to the customer.

The contact information 264 includes mailing addresses, billing addresses, email addresses, phone numbers, and other contact information for a user that is stored in a user account. In some embodiments, the mailing address or billing address is also a delivery address for same-day delivery orders. The email address can be used to login to the user account. The user can also receive confirmation messages, receipts, and other account information at the email addresses associated with the user account. The phone numbers can be landline or cellular phone numbers at which a user or users associated with a user account can be contacted. In some embodiments, a cell phone number can be utilized to communicate with a user about substitutions and other status updates for an order. Such communications can come directly from a delivery user that is preparing a customer's order for same-day delivery. The phone numbers can also be used to contact a user in case of problems with orders or delivery.

The preferences data 266 saves information about a user's preferences while using a retailer website. Preferences can be saved for items, brands, categories of items, store locations, delivery modes, payment methods, and delivery addresses. Some preferences can be set directly by a user in a preferences page. Some preferences can be inferred from the shopping history data 260.

Figure 7:
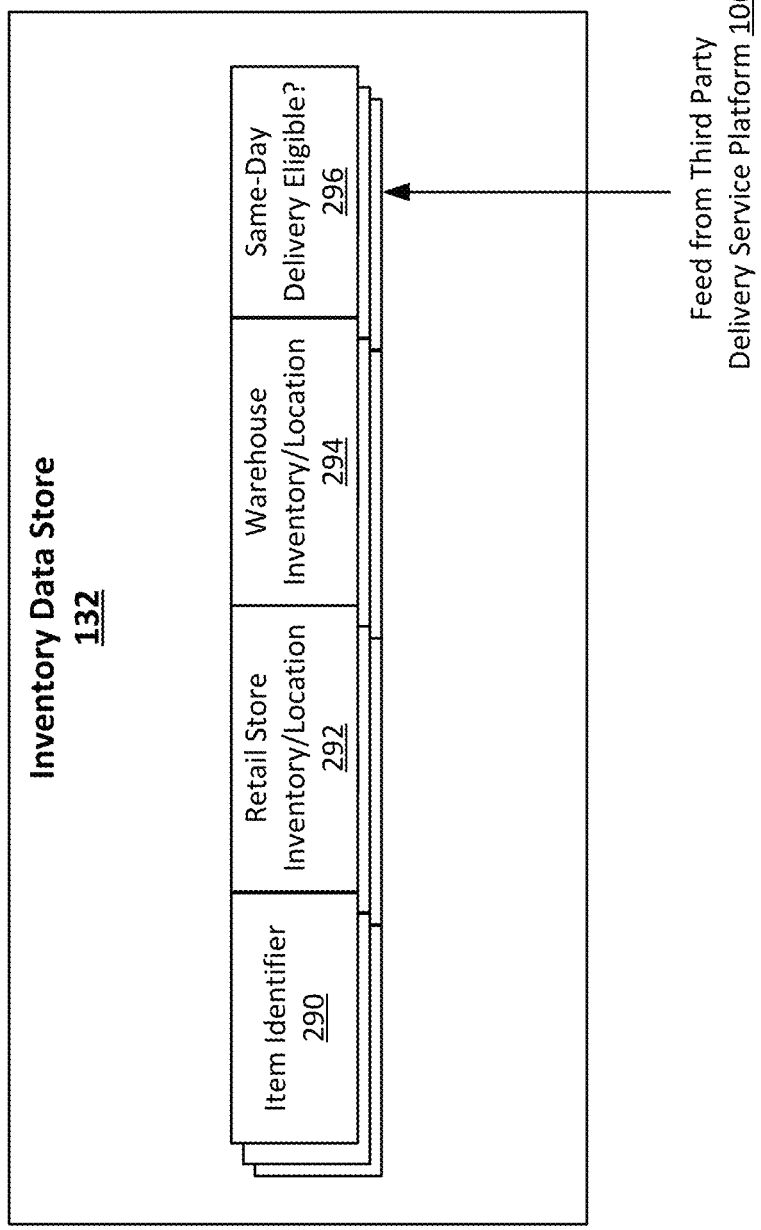
FIG. 7 displays a detailed block diagram of the inventory data store of FIG. 2.

FIG. 7 illustrates a detailed block diagram of the inventory data store 132 of FIG. 1. The inventory data store 132 stores information pertaining to each item in inventory. In some embodiments, the data is stored end tables or is otherwise organized buy item. In the example of FIG. 7, each row of the table represents an item and each column of the table represents characteristics of the item pertinent to order processing and delivery. Here each row includes an item identifier 290, a retail store location 292, a warehouse location 294, and an indication of whether the item is same day delivery eligible 296.

The item identifier 290 provides a means for identifying an individual item. For example, the item identifier could be a unique name comprising alphanumeric symbols. Alternatively, the item identifier 290 could be a unique item number. The item identifier 290 could be linked to a barcode or other means for scanning and identifying an item.

The retail store location 292 identify one or more locations at which the item can currently be located. The retail store location 292 can serve as an indicator of availability of inventory. in instances where the item is not available at any retail store location, this field may be blank or otherwise indicate lack of availability.

The warehouse location 294 identifies one or more locations the item can currently you located. However this refers to warehouse locations rather than in store locations. Indication of warehouse locations having an item in stock serve as an indicator of availability. Again, in instances where the item is not available at any warehouse location, this field may be blank or otherwise indicate lack of availability.

The same-day delivery eligible field 296 indicates weather item is eligible for same-day delivery. This field may be generic to any same day delivery service or maybe specific to a particular same-day delivery service provider. In this example, the same-day delivery eligible field 296 only has two options: yes or no. Criteria for determining same-day delivery eligibility can be determined based on criteria specified by the retailer, the delivery provider, or combination of the two. In the example of FIG. 7, the same day delivery eligibility is determined at least in part upon information said from the third party same-day delivery service.

In some embodiments, the same-day delivery eligible items 156 are items that are sold in stores and also meet other criteria. The other criteria can be a per-item weight limit such as less than 50 pounds, less than 40 pounds, less than 30 pounds, or less than 20 pounds. The other criteria might be that the items are included in a particular category such as groceries or paper goods. Some items might only be available for same-day delivery when ordered online. Such items can include perishable grocery items such as meat and produce.

The inventory data store 132 can be accessed by the online ordering system 122 to determine which items are in stock and what methods of delivery can be used to deliver the items.

Figure 8:
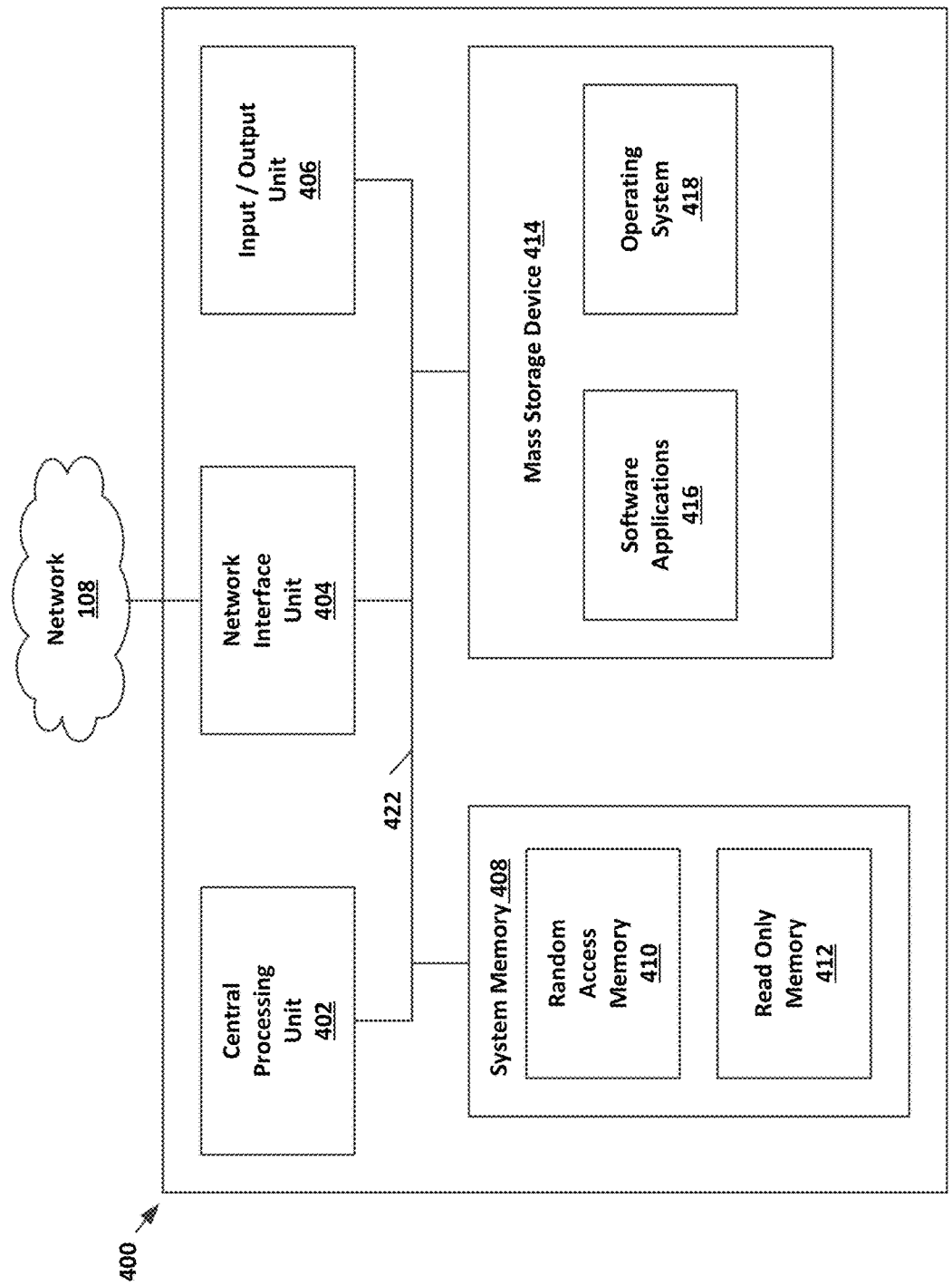
FIG. 8 displays a schematic diagram of an example computing device usable in the system of FIG. 1.

FIG. 8 displays a schematic diagram of an example computing device 400 usable in the system of FIG. 1. The example computing device 400 is representative of the customer user computing device 103 and the delivery user computing device 104 of FIG. 1.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 420 to receive and analyze carrier information to optimize delivery modes.

Figure 9:
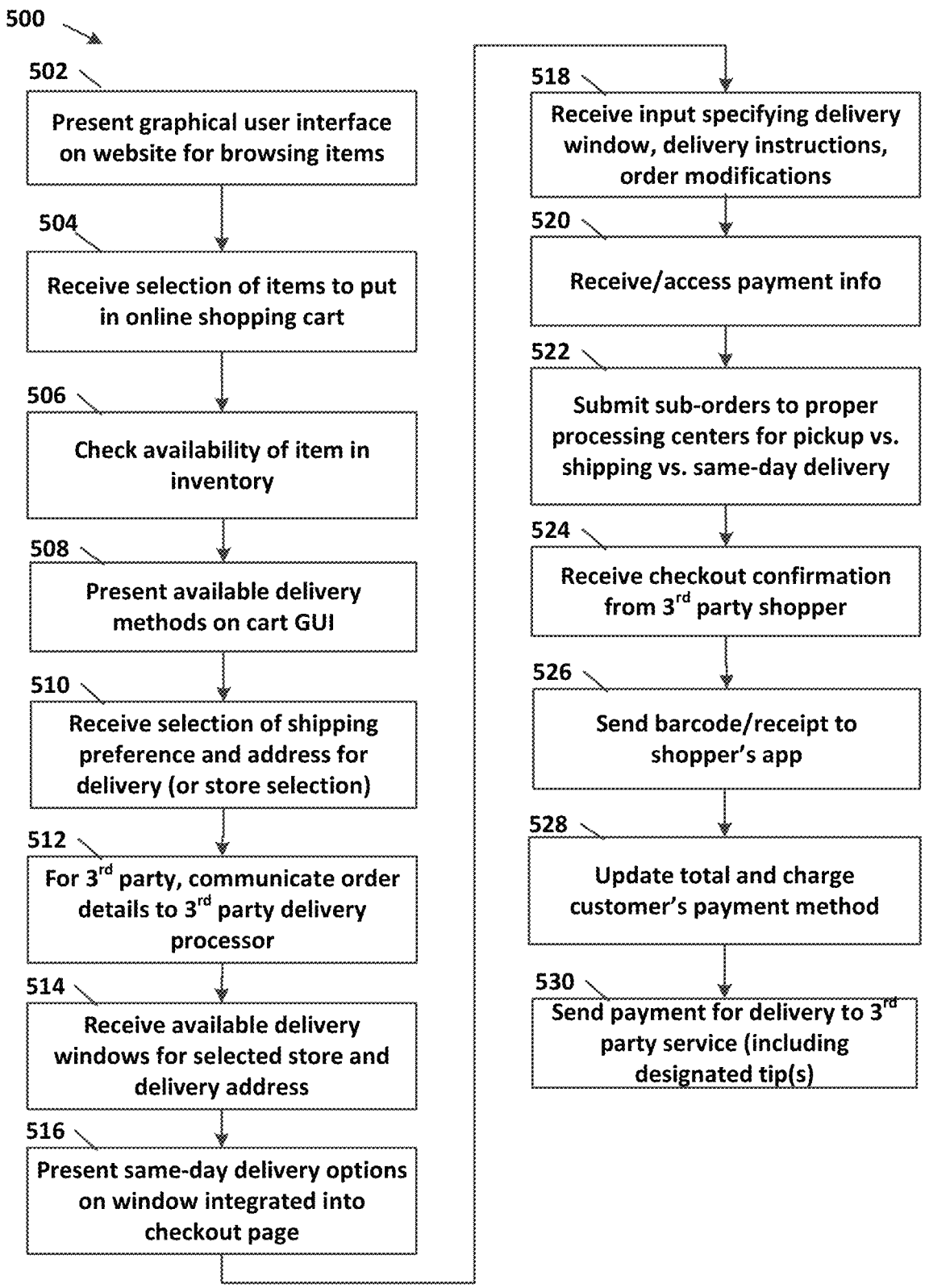
FIG. 9 illustrates an example method of presenting a retailer user interface for receiving orders for delivery of items to a customer.

FIG. 9 illustrates an example method 500 of placing an order through a retailer user interface for delivery of items to a customer. This method 500 can be performed by the system 100 described in FIG. 1.

A retailer website is accessed by a computing device such as the customer user computing device 102 of FIG. 1. The retailer website is configured to present a graphical user interface (GUI) usable to view information about items available for sale through the retailer, access user accounts, and access order information. In some embodiments, the retailer website can offer additional functionality to customers.

A user login is optionally received. In some embodiments, users can operate the website without logging in. In some embodiments, users remain logged in even when not accessing the website due to cookies being stored on the customer user computing device 103. The login accesses a user's account on the website, which can store such information as delivery addresses, preferred store locations, and payment methods.

At operation 502, a GUI is displayed on the retail website for browsing items. In some embodiments, filters are displayed to narrow down items displayed based on one or more criteria. The item information can include photographs of items, videos of items, and text descriptions of items. The text descriptions can include characteristics such as dimensions, color, weight, size, and brand. The descriptions typically include a price for each item. In some embodiments, available methods of delivery for each item along with any additional costs for that method of delivery are displayed. Some examples of methods of delivery include same-day scheduled delivery provided by a third-party delivery service provider, same-day delivery provided by the retailer, in-store pickup, delivery to a storage locker, next-day delivery provided by a shipping carrier, and shipping by a carrier at a time of two days or greater from order date.

In some embodiments, the items can be browsed by category, narrowed down using filters, or both. The filters operate to show only items that have specified criteria. Such criteria can include characteristics of the items such as brand, color, etc. The criteria can also relate to availability of the item at a particular location or availability of different methods of delivery of the item. For example, a user could select to filter grocery items by availability of same-day scheduled delivery. This would narrow down the items displayed to only those available for same-day delivery. In some instances, the items could be further narrowed down based on availability for same-day delivery from a specific store location. In another example, items could be narrowed down based on availability of two-day shipping or availability for in-store pickup at a nearby retail location.

At operation 504, item selections are received. Items selected for purchase are stored in a digital online shopping cart. The shopping cart tracks the items a user wishes to purchase until the user checks out and submits payment for the items. In some embodiments, at least one item selected for purchase by a user is eligible for same-day delivery by a third party delivery service provider. In some embodiments, at least one item selected for purchase by a user is selected for delivery by a third party delivery service provider. In some embodiments, at least two items are selected for purchase where one item is to be delivered the same day by a third party delivery service provider at a scheduled time and another item is to be delivered by a delivery method other than same day delivery.

At operation 506, availability of the item is determined based on inventory. This determination can be based on a delivery location. In some embodiments, a zip code is determined to ascertain a general location for delivery or store pickup. The zip code can be determined based on an address on file in a user account or based on the location of the user's computing device. In some embodiments, the location is received from user input. In some embodiments, the location is not determined until during checkout. In other embodiments, the location is determined immediately upon user access of the retailer website.

At operation 508, delivery method options for each item are displayed based on the delivery location. In some embodiments, these delivery method options can be displayed for each item before it is selected for purchase if the delivery location is already determined. In some embodiments, the delivery method options are not displayed until the item is in the online shopping cart. The delivery method is determined based on availability of the item at a retail store or warehouse as well as characteristics of the item itself. Some types of items are only available for shipping by carrier due to size and weight. Other types of items are not sold in stores so are only available for shipping by carrier from a warehouse. Some types of items are not conducive to lengthy shipping times, such as perishable grocery items. Such items might only be available for in-store pickup or same-day delivery. Some frozen or refrigerated items might not even be eligible for in-store pickup and can only be delivered by scheduled, same-day delivery. Other items may have a multitude of delivery method options. For example, a small, non-perishable item sold in stores could be delivered by same-day scheduled delivery by a third-party, picked up in-store, or shipped by carrier within a couple of days.

At operation 510, a selection of a delivery method is received. Depending on the method chosen, the user may be prompted to input a delivery address or select a particular retail store location. In the case of items having more than one delivery method option, a default delivery method may be selected by the retailer website. The default delivery method might be the least expensive delivery method available. For such items, the user can select to change the delivery method in operation 518. Changing the default delivery method could incur additional charges to a user's order.

At operation 512, items ordered for same-day delivery are processed and order details are communicated to a third party delivery processor. Order details include at least a delivery address and scheduled delivery timeframe.

At operation 514, available delivery windows are received from the third party same-day delivery service platform 106 through the integration API 110. The available delivery windows for scheduled same-day delivery at determined based on a location of a retail store and a location of a delivery address.

At operation 516, same-day delivery options, including available delivery windows, are displayed on a window integrated with the checkout page on the GUI. In some embodiments, the delivery options include visual elements from the third party same-day delivery service. In some embodiments, the other delivery options include substitution options, delivery instructions, and the like.

At operation 518, input is received specifying a delivery window, delivery instructions, and order modifications.

At operation 520, payment information is accessed. In some embodiments, a customer user enters payment information at the time of checkout. In other embodiments, the payment information becomes available upon user login if the user has payment information saved in the user's account.

Operation 522 portions of each order are forwarded to individual processing centers for each type of delivery method. For example one order could be divided into three different suborders with one sub order including items being prepared for in-store pickup, another sub order including items that will be delivered the same day by a third-party delivery service, and another sub order having items that will be shipped by a carrier within a few days. Each processing center requires different information to complete delivery. However all processing centers require a selection of a delivery address or store location as well as a list of items requested.

A receipt is sent to third-party delivery service shoppers for all items that are ordered for same-day delivery. The confirmation indicates that the third party same-day delivery service shopper has retrieved all the requested items for same-day delivery at a retail store. In some embodiments, the checkout confirmation comes from a POS system. In other embodiments the checkout confirmation could come from an app operating on a delivery user computing device 112.

The shopper checks out on an application on the delivery user computing device 112, a barcode or receipt may be sent to the shopper's app. The barcode or receipt can be checked by an employee of the retail store to confirm that the shopper has checked out. Thus, a shopper can avoid having to pay for a grocery order and simply bypass the payment step because the items are being charged directed to the customer user by the retailer.

At operation 528, the order total is updated to reflect any changes to the order that were made while the shopper was retrieving items from the retail store. For example if an item was unavailable or another item was added to an order after the customer user initially checked out online, the total price for the order could change. At the time that the third party checks out to the online retailer. Then the customer user's payment method is charged with the updated total.

At operation 530, payment is sent from the online retailer to the third party same-day delivery service 4 completing tool and some vitamins, the payment is mediated through the third-party delivery service platform. In such an embodiment, payments may be accumulated for each individual delivery user D before submitting payments to the delivery user. In other embodiments individual payments are forwarded to the delivery users as deliveries are completed. Payments to the delivery users can also include tips that are selected by customer users.

Figure 10:
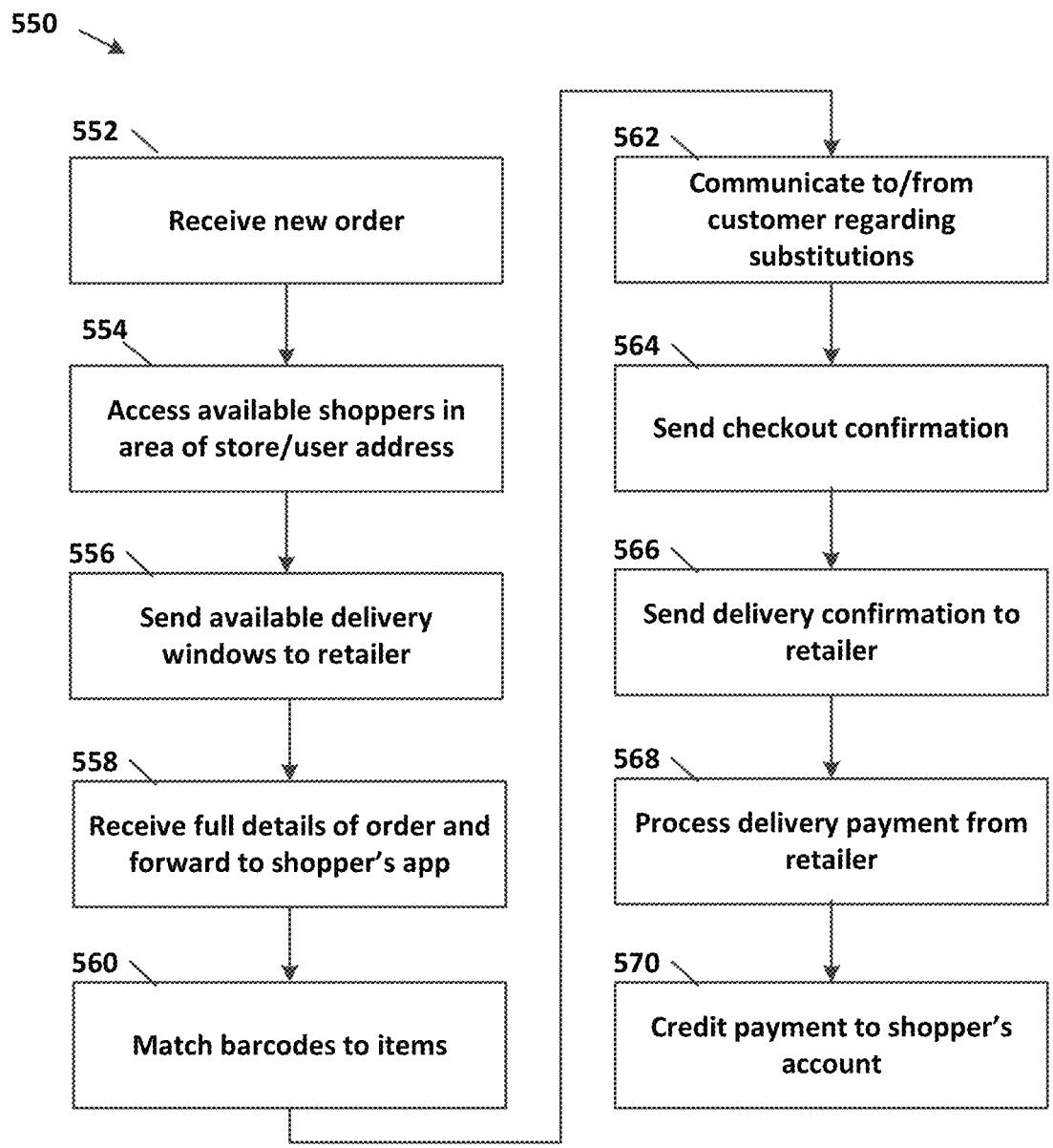
FIG. 10 illustrates an example method of integrating third party same-day delivery service options into a retailer online ordering system.

FIG. 10 illustrates an example method 550 of accessing a user interface for completing a delivery of retail items to a customer. This method 550 can be performed by the delivery service platform 106.

At operation 552, the third-party delivery service platform 106 receives a new order at the third-party delivery processor 138. The order can include information about items requested, and delivery location. The order can also include information about the retailer from which items are requested.

At operation 554, available delivery are users in the area of the delivery location are accessed. This information can be accessed from the delivery data store 230. Delivery users or shoppers can indicate availability if I sign up for time periods at which they can the complete deliveries. In some embodiments, delivery users indicate availability and by logging into an application such as the delivery user app 238.

At operation 556, available delivery windows are communicated to the retailer interface. This communication is mediated through the API 110. The delivery windows indicate a schedule delivery timeframe in which the requested items can be delivered to the delivery address.

At operation 558 full details of an order are received at the third-party delivery processor 138 and are stored in the delivery data store 230. Full details can include a list of items, a retail store location, a customer identifier, and a delivery address in addition, the full details will include a desired delivery window. In some embodiments, the full details of the order do not include payment information for the customer requesting delivery. The full details are forwarded to a selected delivery user to be displayed on a delivery user computing device 112 operating a delivery user app 238.

At operation 560, the delivery user D operates the delivery user computing device 112 to scan barcodes of items to match with items on a list associated with an order. Other methods of documenting items that are retrieved by the delivery user are possible such as checking off a list displayed on the delivery user app 238. In some embodiments, the delivery app 238 scans barcodes and uses those to check items off of a list for an order as well as to add the items to a virtual shopping cart.

Operation 562, optional communications between the delivery user D and the customer users C are made to determine how the delivery user D should handle unavailable items. In some instances default selection is made when the customer user places an order for same-day delivery. A delivery user can send a message to the customer user to confirm a substitution. In some embodiments the deliver user can receive communications from a customer user while the delivery user is still shopping at the store and can accept requests from the customer user to add additional items to the order. In some instances this communication is performed directly between the delivery user D and the customer user C via text messaging. in other embodiments, electronic communications are mediated through the delivery service platform 106 and the online retailer platform at 104.

At operation 564, checkout confirmation is communicated from the third-party delivery service platform 106 to the online retailer platform 104 through the integration API 110. In some embodiments, checkout confirmation is communicated with the delivery user app 238 when all requested items have been scammed, substituted, or indicated that a customer would not like to substitute and unavailable item. The confirmation is communicated from the delivery user app 238 to the delivery manager 228 which communicates the confirmation to the online retailer platform through the integration API 110. In other embodiments, checkout confirmation can be obtained directly from delivery user at the retail store. In some embodiments, the delivery user D can checkout at the retail store using only the delivery app, thus avoiding a checkout line.

At operation 566, delivery confirmation is sent to the retailer. Delivery confirmation is communicated through the delivery user computing device 112. In other embodiments, customers can send a confirmation message to the online retailer platform indicating that delivery has been completed. In some embodiments, use of GPS is used to confirm deliveries.

At operation 568, payment for completion of delivery is processed from the online retailer platform 104. Payment information is communicated through the integration API 110 to the delivery manager 228. Payment is handled directly between the retailer and the third-party delivery service. Any fees or tips contributed by the customer user our first routed through payment to the retailer.

At operation 570, payment is credited to the delivery user's account, where it can be recorded and viewed on the delivery user app 238. In some environments payments are made as the delivery user D completes deliveries. In other embodiments, payments accumulate in an account associated with the delivery user D and are paid out at regular intervals.

Figure 11:
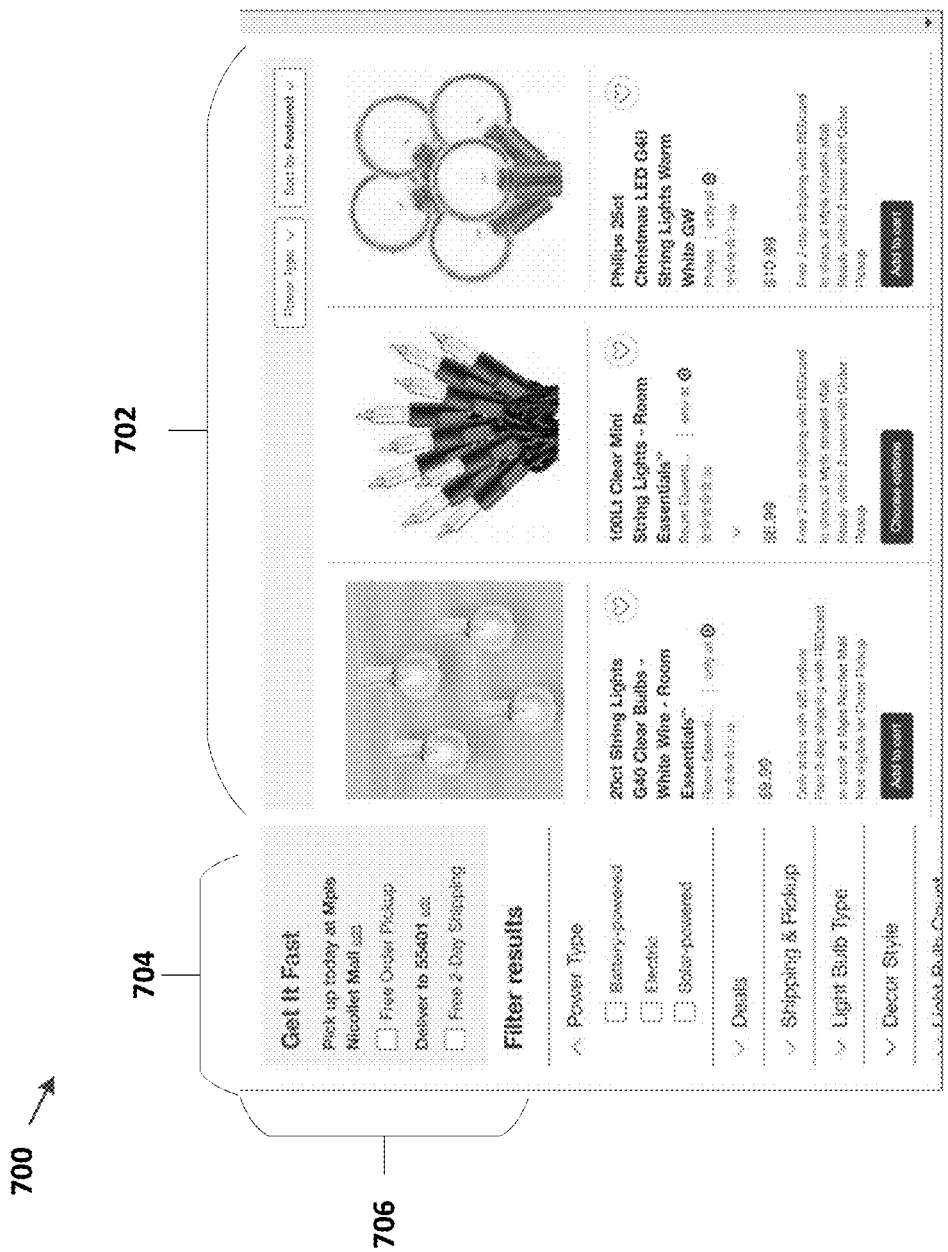
FIG. 11 illustrates an example graphical user interface presented on a retailer website illustrating items selectable for same-day shipping via a third party delivery service.

FIG. 11 illustrates an example graphical user interface (GUI) 700 configured to provide access to a retailer website. The GUI 700 can be displayed on a user device such as the customer user computing device 102 of FIG. 1. In the view shown in FIG. 13, user input has been received at the GUI 700 to browse string lights available to purchase from an online retailer. Item descriptions 702 are shown including graphical representations of items within the string lights category. A series of filters 704 are shown which can be selected to further narrow down the items that are displayed on the GUI 700. Delivery mode filters 706 can narrow down items based on availability of different delivery modes. In the example of FIG. 11, the displayed items can be narrowed down based on availability of in-store pickup at "Mpls Nicollet Mall" store location, or delivery by 2-day shipping to zip code 55401.

Figure 12:
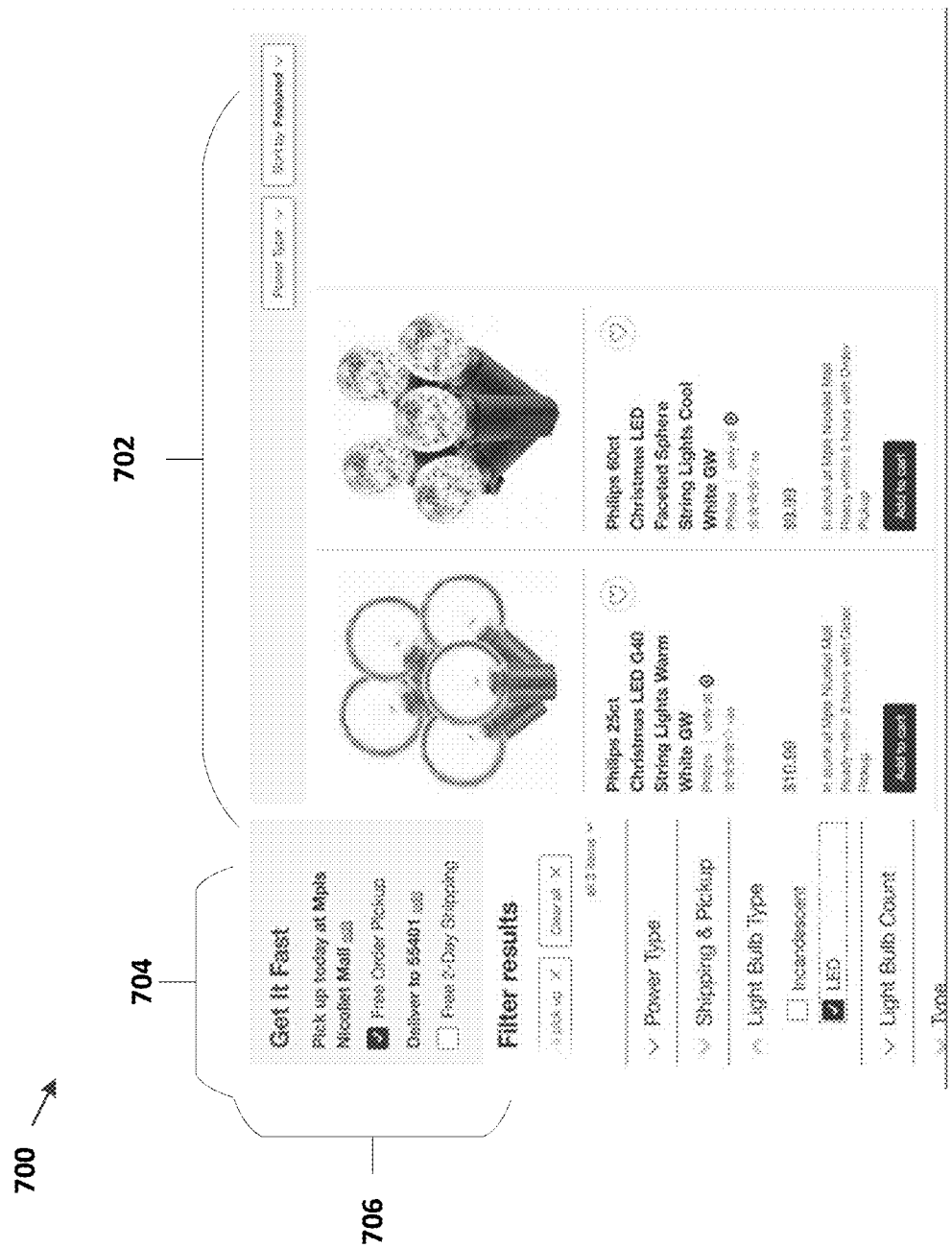
FIG. 12 illustrates another view of the graphical user interface of FIG. 11.
Figure 13:
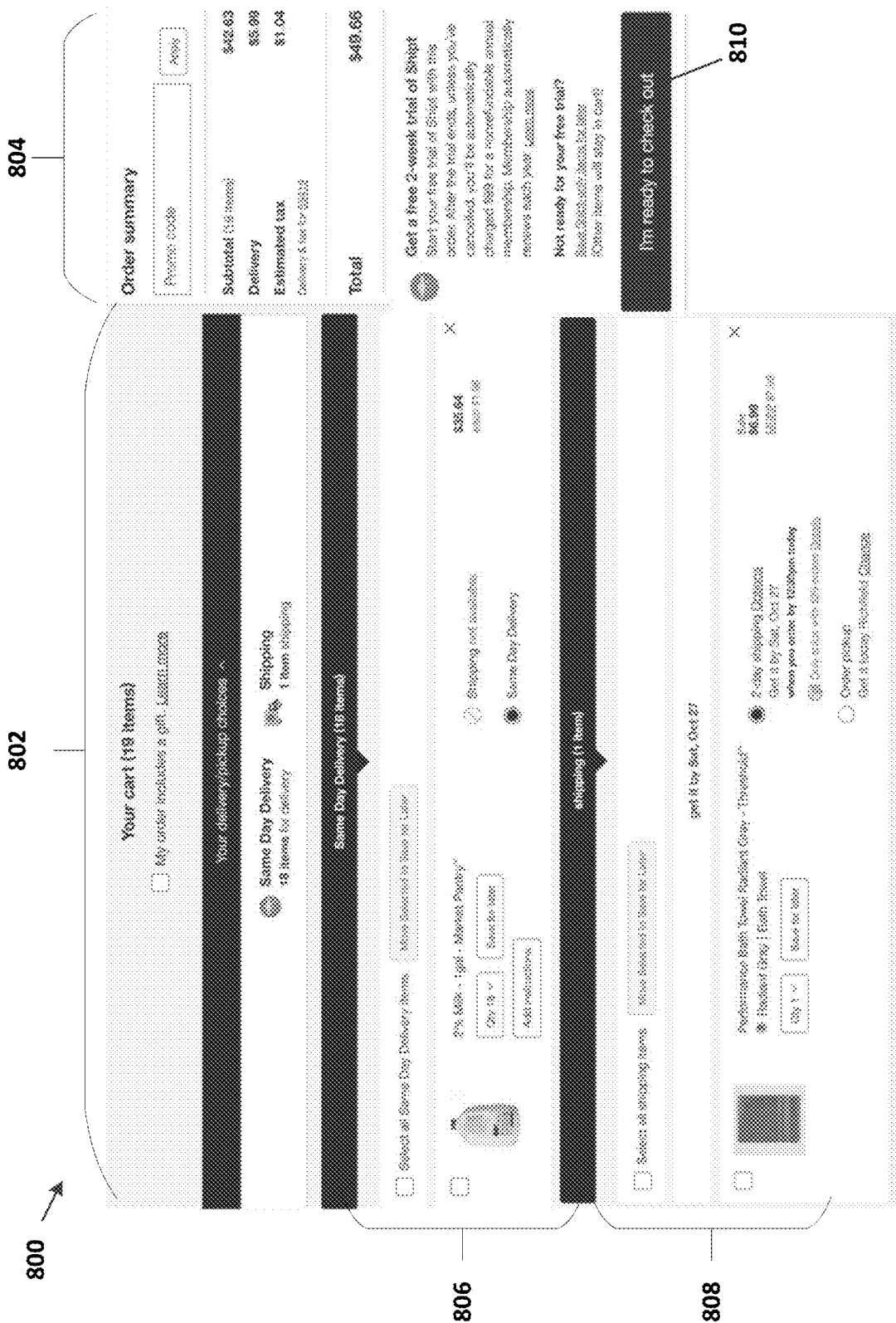
FIG. 13 illustrates an example graphical user interface showing a shopping cart including items eligible for same-day delivery and items not eligible for same day delivery on a retailer website.

FIG. 12 illustrates another view of the GUI 700 of FIG. 13. In this view, the list of items 702 displayed in the string lights category has been narrowed down. User input has been received to select filters 704 narrowing down the items displayed based on both available delivery methods (filter 706) as well as characteristics of the items. In the example of FIG. 12, the items displayed are available for order pickup as the delivery method. The items displayed also fall within the category of "LED" light bulb type.

FIGS. 11-12 illustrate how the GUI can be utilized to filter items available for purchase based on availability of particular delivery methods. In this example, the availability is also determined based on a particular retail store location. In some embodiments, to see availability at a given location, a user must provide some location information. This information could be entered by the user in the form of a zip code or address. The information can also be obtained in a more automated fashion by receiving a login to an account including location information. In another embodiment, the location is determined based on the current location of the computing device used to access the retailer website. The location can be obtained based on GPS, a wireless network connection, or an IP address.

FIG. 13 illustrates an GUI 800 presented on a retailer website that provides an online shopping cart view. The cart display includes a summary of order information. The order information includes a list of items selected for purchase 802 and a total price 804 for all of the selected items. This total price 804 can take into account taxes, discounts, delivery fees, etc.

In the example of FIG. 13, the items in the online cart are arranged into sections based on delivery method (806, 808). In an initial display of the shopping cart, the delivery method for each item could be selected by default by the system. As user inputs are received to change the delivery method of one or more items, those items could move around in the display. Here, there are 18 items selected for delivery by same-day delivery (section 806). As shown, this is the only available delivery method for these items. There is one item selected for delivery by shipping (section 808). This item could also be delivered by in-store pickup.

The GUI further includes a button 810 to initiate the checkout process. This initiates the display of one or page checkout pages that are generated based on the selected items.

Figure 14:
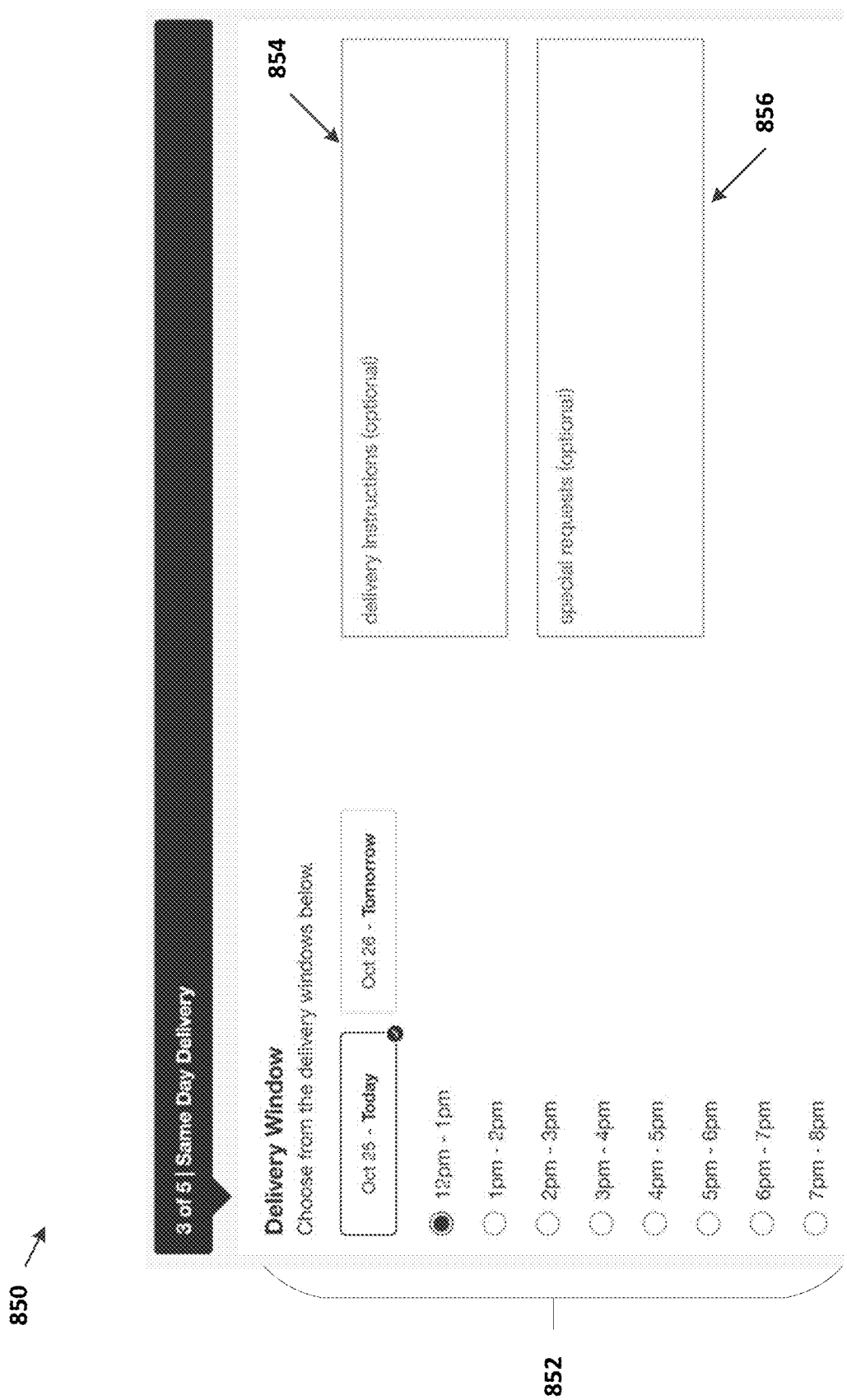
FIG. 14 illustrates another view of the graphical user interface of FIG. 13, showing a further set of options selectable by a customer in the event same day delivery is requested.

FIG. 14 illustrates an example GUI 850 displaying same-day delivery options. Such display would be presented on a user device when items eligible and selected for same-day delivery are in an online shopping cart. The delivery options could be presented before initiating checkout, and the delivery request would not be finalized until checkout is complete. In other embodiments, the delivery options are only presented after the customer has initiated checkout.

The delivery options are populated with data received from a same-day delivery service. This could be a third party same-day delivery service provider. That provider could employ people full time or use crowd-sourced contractors. Alternatively, the same-day delivery could be provided by the same entity as the retailer. This entity could use employees or crowd-source as well.

In the example of FIG. 14, the GUI 850 displays options for scheduled delivery. The scheduled delivery periods or delivery windows 852 are shown for the current day as well as the following day. A series of one hour delivery window times 854 are shown. The one hour delivery windows are populated from data supplied by a same-day delivery service. In some embodiments this data is communicated to the system through third-party delivery service integration API 110. In such embodiments, the delivery windows are determined based on availability of delivery users to complete deliveries for the third party delivery service in or around a location associated with the order. The delivery time windows 852 can provide specified scheduled delivery time frames of various lengths. For example the time window could the 4 hours, 3 hours, 2 hours, 1 hour, 30 minutes, 15 minutes, 10 minutes, or 5 minutes. In some embodiments, an exact delivery time is designated such as 12:30 p.m.

FIG. 14 further provides fields for entering delivery instructions 854 and special requests 856. In the example of FIG. 14, entering text into these fields is optional. A customer user may desire to provide additional instructions for providing delivery to a delivery address such as "please ring doorbell," "gate code 1 2 3 4," or "please come to Back Door." Special requests for selecting items such as "select green bananas," or "if they don't have blueberry yogurt please substitute with pineapple."

Figure 15:
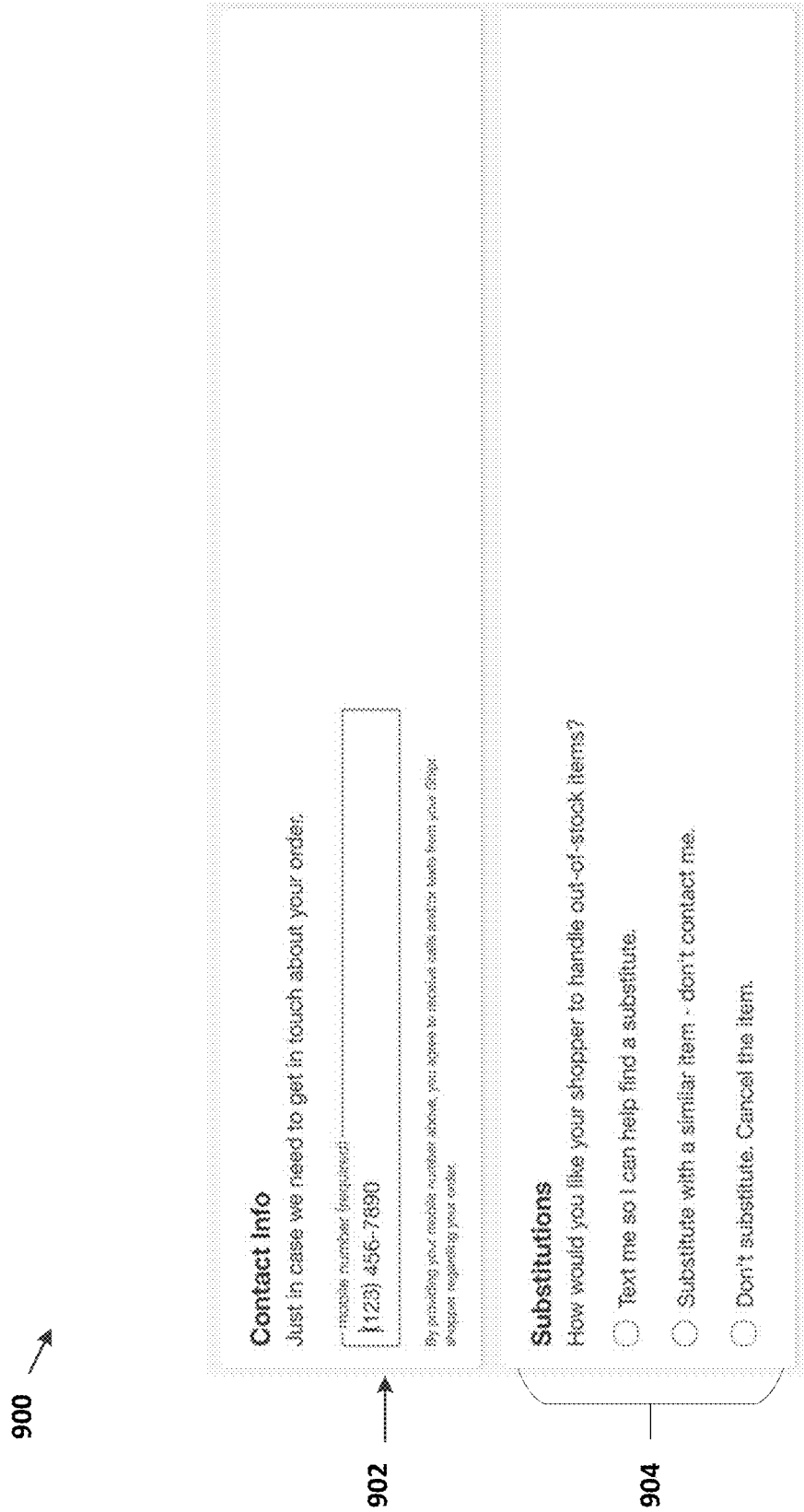
FIG. 15 illustrates another view of the graphical user interface of FIG. 13, showing a further set of options selectable by a customer in the event same day delivery is requested.

FIG. 15 provides another example view of the retailer GUI 900 that can be displayed in conjunction with the display of FIG. 14 or displayed after selections are made in the page of FIG. 14. A contact information field 902 is provided in which a customer user can enter a mobile telephone number. This number will be utilized to communicate with a delivery user about instructions for modifications to an order. For example, a delivery user might text message customer user to determine how to substitute an unavailable item. In other embodiments, the delivery user could communicate with the customer user indirectly using an application that communicates through the third party same-day delivery service platform 106 and the online retailer platform 104.

The GUI 900 displayed in FIG. 15 also includes a substitutions field 904 for making selections for substitutions. This allows a customer user to specify how a delivering user should modify an order if a requested item is unavailable. Here, the prompt is "How would you like your shopper to handle out of stock items?" The customer user can provide input to the substitution field 904 to select one of three options. The first option requests that the delivery user text messages the customer user to determine a suitable substitute. The second option requests that the delivery users substitutes the missing item with a similar item without contacting the customer user. The third option requests that the item be cancelled if it is not available.

Figure 16:
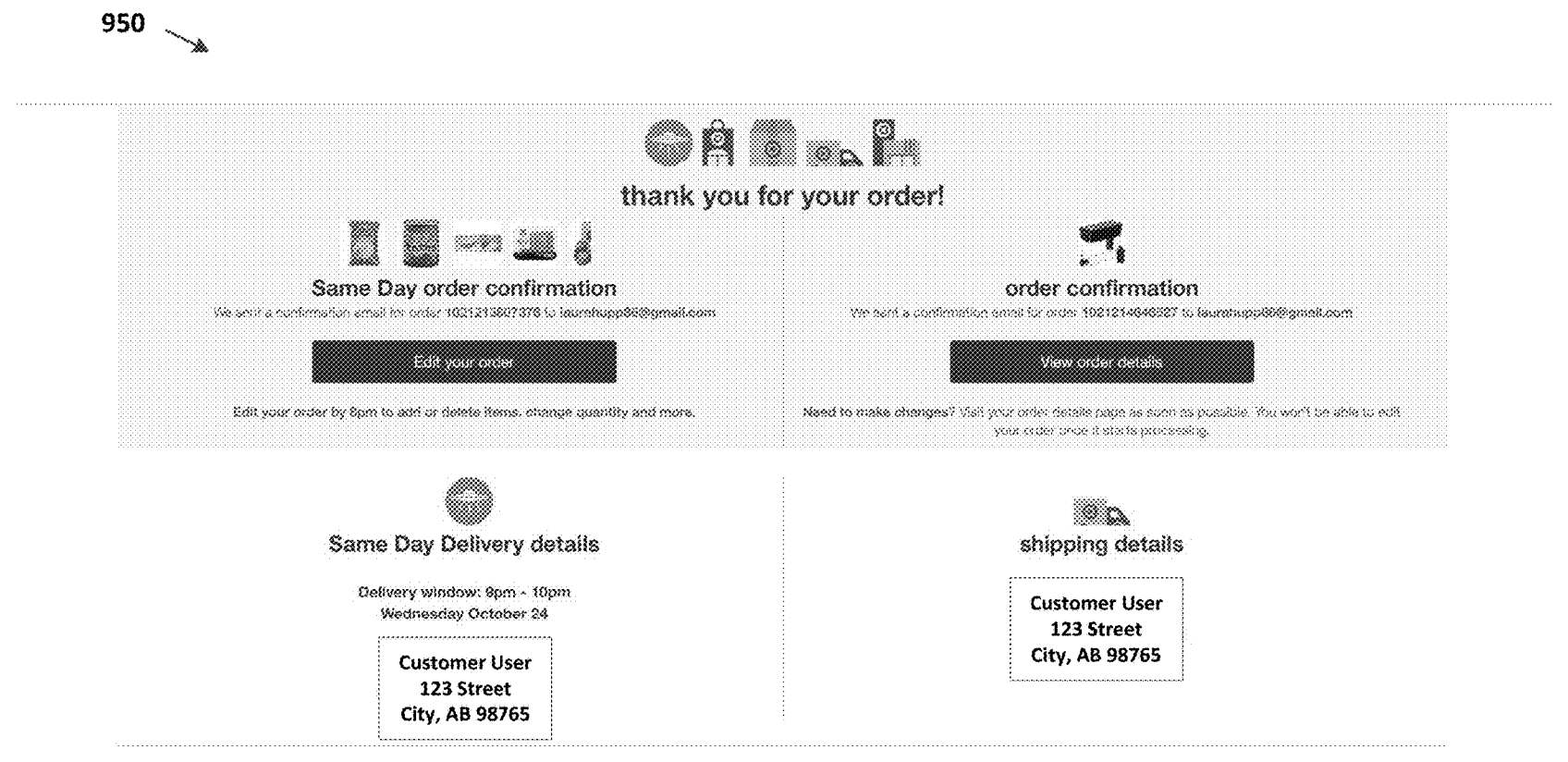

FIG. 16 displays another view of a GUI 950 after an order has been submitted for checkout. The GUI 950 displays a message thanking the customer user for placing the order. Separate confirmations are displayed for items that are ordered for shipping versus same-day delivery. An order edit button is provided to allow a user to edit the same day shipment order up until a certain point. In this example the customer user has until 8 p.m. to add or delete items change quantity and more. Same day delivery details are provided including the delivery window time and delivery address. The GUI 950 also displays a logo of the third-party same-day delivery service provider that will be delivering the order.

Figure 17:
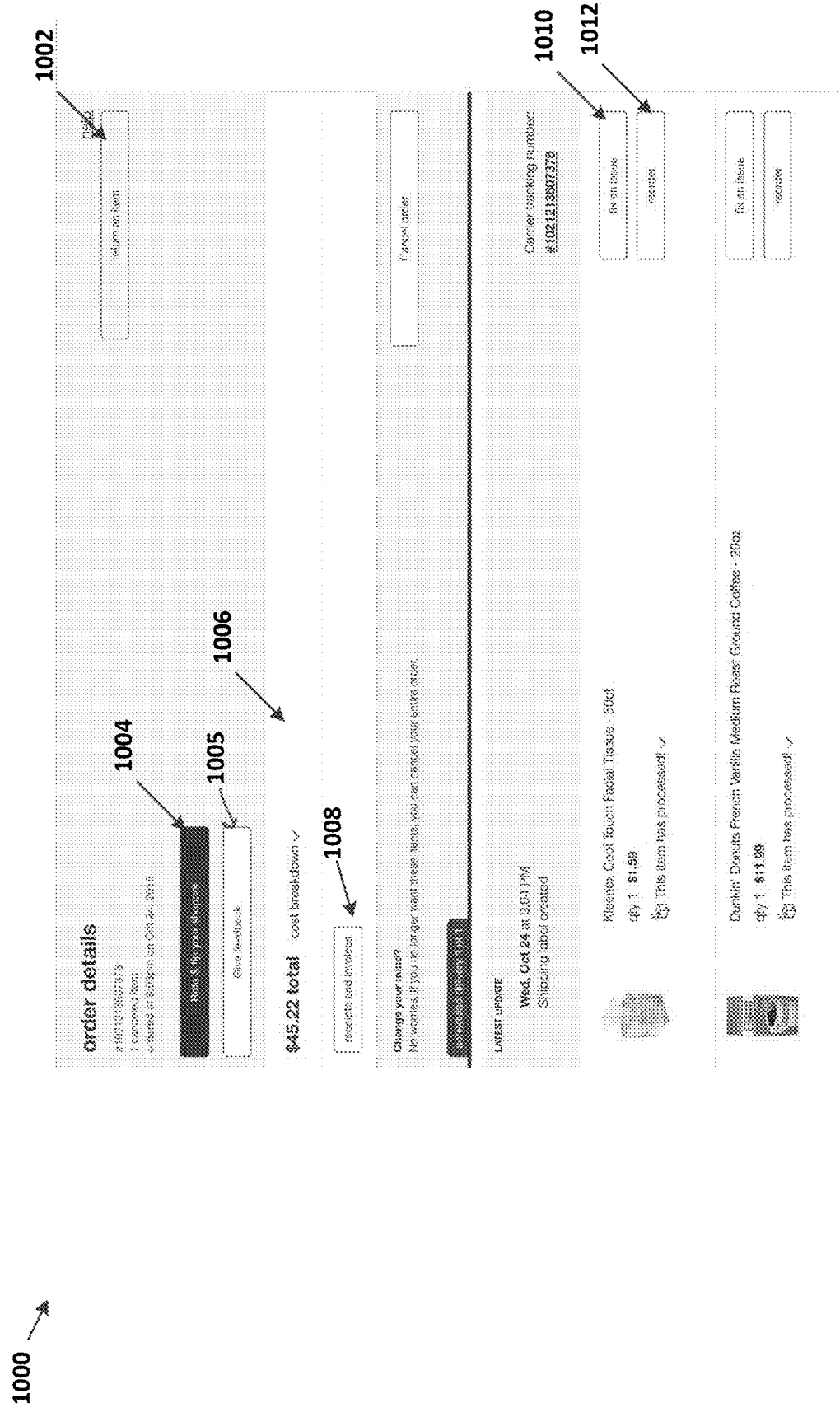
FIG. 17 illustrates another view of the graphical user interface of FIG. 13, showing post-order interactive elements selectable by a customer for providing post-order modification and/or feedback.

FIG. 17 displays another view of a GUI 1000 that includes order details for items that were ordered for same-day delivery. The order confirmation number is displayed as well as information about when the order was placed and an indication that one item was cancelled. In this example one item from the order was unavailable at the retail store and a suitable substitution could not be found. The shopper then cancelled the item from the order. A series of buttons are displayed with the order details including a return an item button 1002, a rate and tip your shopper button 1004, and a give feedback button 1006.

The return an item button 1002 allows the user to indicate an item that is defective and that the user wants to return. Additional options for making returns will be displayed in another view of the GUI. The GUI allows a user to view options for rating a delivery user (shopper, 1004). In some embodiments, the customer user can also choose to tip the shopper. The tip will be added to the customer user's total for the purchase. The give feedback button allows written feedback about the process.

The GUI further displays a total price 1006 for the order along with a pull-down menu to show the cost breakdown of the order. A button for receipts and invoices 1008 is displayed which when selected will display detailed receipts and invoices for the order. A cancel button is displayed that when selected will cancel the entire order. An order summary for a first scheduled delivery is displayed including shipping updates and a carrier tracking number. For each item image, text description, quantity, price, and shipping status are displayed. In addition buttons are displayed enabling a customer user to select to "fix issue" 1010 or "reorder" 1012.

Figure 18:
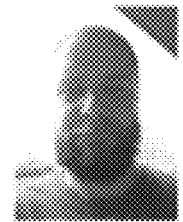
FIG. 18 illustrates another view of the graphical user interface of FIG. 13, showing post-order interactive elements selectable by a customer for providing post-order feedback regarding a delivery user.
Figure 18:
Figure 18:
Figure 18:
Figure 18:

FIG. 18 displays another view of the GUI 1100. Options for tipping and leaving feedback for a delivery user are displayed. In this example, a summary of the order price and name of shopper are displayed. The customer user can select a star rating for the delivery user 1102, select a tip to pay the delivery user 1104, and provide a text review 1106.

Figure 19:
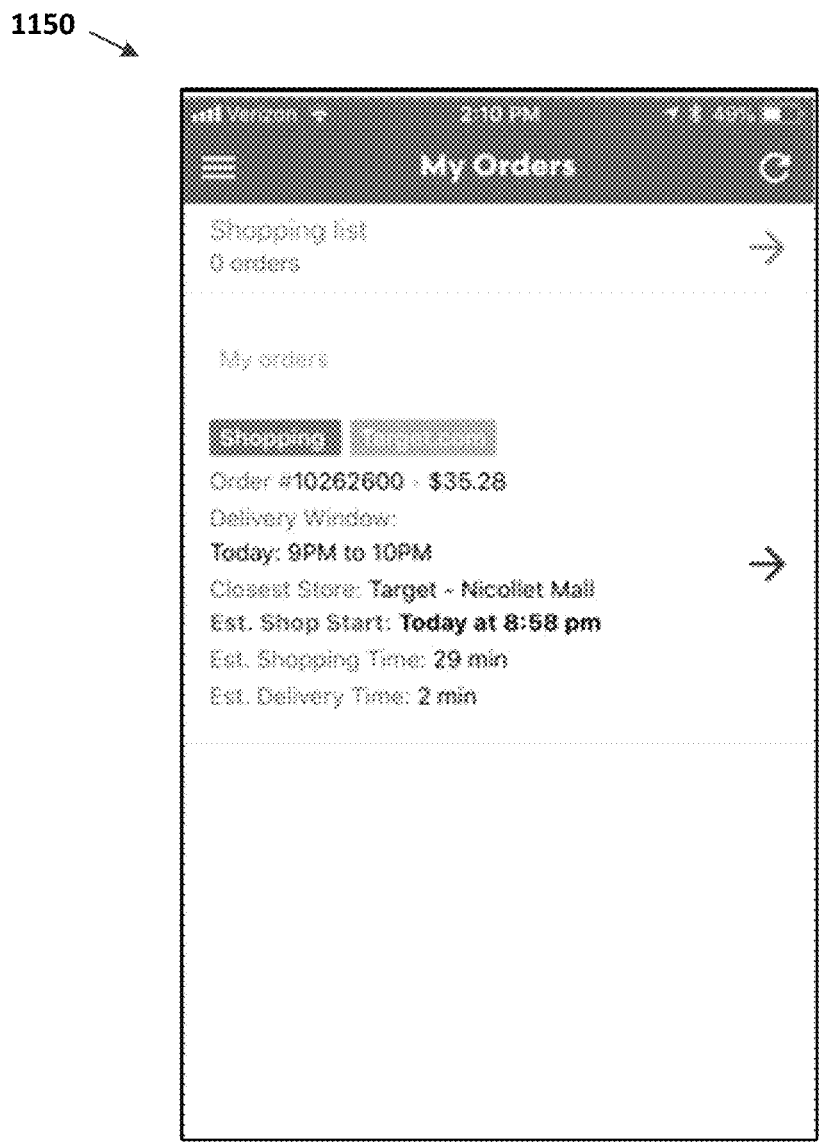
FIG. 19 illustrates an example graphical user interface presented on a delivery user computing device.

FIG. 19 displays a further example GUI for display on a delivery user computing device. The GUI 1150 can be presented on a mobile device of a delivery user, for example to facilitate selection of items from a retailer, validation of those items, and communication with a customer in the event such communication is required (e.g., to modify order items or address specific delivery questions that may arise). For example, the GUI 1150 may display a shopping list for use by the delivery user, as well as for validation by a retail employee to validate the delivery user's selections. In some embodiments, the GUI 1150 may further includes a user interface that can be presented to the delivery user for exchanging text messages with a customer to address any discrepancies or issues that arise during delivery. Furthermore, the GUI 1150 may present an item list so that the delivery user may not be required to proceed through check out at a retail location when selecting items.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A retailer integration platform of a same-day delivery service provider, the platform comprising:
   a delivery user application installable on a mobile device; and
   a computing system of the same-day delivery service provider including a processor communicatively connected to a memory configured to store instructions which, when executed by the processor, cause the computing system to:
   publish an application programming interface (API) configured to integrate the same-day delivery service provider with a retailer website;
   receive, from the retailer website at the API, an identification of an item location of a first item designated for delivery and a delivery location of a requesting user;
   after a determination that the first item of an order is eligible for delivery by the same-day delivery service provider and that a second item of the order is not eligible for delivery by the same-day delivery service provider, generate two or more delivery window options available for delivery of the first item based at least in part on availability of delivery users within a predefined proximity of the delivery location;
   provide, to the retailer website via the API, a visual element of the same-day delivery service provider to display the two or more delivery window options available for delivery of the first item with a checkout page of the retailer website for the order, wherein the visual element is configured to be displayed on a window integrated with the checkout page of the retailer website and the checkout page for the order includes at least one other item that is not eligible for delivery by the same-day delivery service provider, the at least one other item including the second item;
   after a unified checkout process for the order at the retailer website, receive, from the retailer website, a confirmed request for delivery of the first item but not the second item; dispatch a delivery user to fulfill the confirmed request for delivery of the first item from the item location to the delivery location; and receive payment for the delivery including a tip selected by the requesting user at the retailer website without receiving payment information from the requesting user;
   wherein the delivery user application is configured to:
   receive the confirmed request for delivery of the first item;
   receive an input from the delivery user to send an item substitution message to the requesting user; and
   provide the item substitution message to the computing system of the same-day delivery service;
   wherein the instructions, when executed by the processor, further cause the computing system to:
   receive the item substitution message from the delivery user application;
   provide the item substitution message to an online retailer platform to provide to the requesting user via the retailer website or a retailer mobile application, the retailer website and the retailer mobile application being different from the delivery user application;
   receive, from the online retailer platform, a response to the item substitution message, the response to the item substitution request being input by the requesting user at the retailer website or the retailer mobile application; and
   provide the response to the item substitution message to the delivery user application.

2. The platform of claim 1, wherein the delivery user application is configured to receive a scan of an identification code associated with the first item.

3. The platform of claim 2, wherein upon confirmation at the computing system that the identification code is associated with the first item, the computing system generates an indication that the first item has been fulfilled by the same-day delivery service provider, the indication being reviewable by an online retailer.

4. The platform of claim 2,
   wherein the online retailer has a retail location that corresponds to the item location; and
   wherein the instructions, when executed by the processor, further cause the computing system to: following a confirmation that the identification code is associated with the first item, transmit a message to the online retailer platform that the order has been collected from the retail location, the message not including payment from the computing system of the same day delivery service to the online retailer platform.

5. The platform of claim 1, wherein the confirmed request for delivery of the first item comprises a confirmation of a payment transaction between the requesting user and an online retailer, the confirmation lacking at least some details required to effectuate the payment transaction.

6. The platform of claim 5, wherein the confirmation lacks at least payment details of the payment transaction.

7. The platform of claim 1, wherein the determination that the first item of the order is eligible for delivery by the same-day delivery service provider is based at least in part on a characteristic of the first item and an availability of the first item at the item location.

8. A system for integrating a third party delivery service with an online ordering web service of a retailer, the system comprising:
   a delivery user application installable on a mobile device;
      a delivery service platform comprising a processor communicatively connected to a memory comprising:
      a delivery data store;
      an application programming interface configured to integrate the third party delivery service with a retailer website of the retailer; and
      instructions which, when executed by the processor, cause the delivery service platform to:
      publish the API;
      receive, from the retailer website at the API, an identification of an item location of a first item designated for delivery and a delivery location of a requesting user;
      after a determination that the first item of an order is eligible for delivery by the third party delivery service and that a second item of the order is not eligible for delivery by the third party delivery service, generate two or more delivery window options available for delivery of the first item based at least in part on availability of delivery users within a predefined proximity of the delivery location;
      provide, to the retailer website via the API, a visual element to display the two or more delivery window options available for delivery of the first item with a checkout page of the retailer website for the order, wherein the visual element is configured to be displayed on a window integrated with the checkout page of the retailer website and the checkout page for the order includes at least one other item that is not eligible for delivery by the third party delivery service;
      after a unified checkout process for the order at the retailer website, receive, from the retailer website, a confirmed request for delivery of the first item but not the second item; and
      dispatch a delivery user to fulfill the confirmed request for delivery of the first item from the item location to the delivery location;
      wherein the delivery user application is configured to:
      receive the confirmed request for delivery of the first item;
      receive an input from the delivery user to send an order complete message to the requesting user; and
      provide the order complete message to the computing system of the same-day delivery service;
   wherein the instructions, when executed by the processor, further cause the computing system to:
      receive the order complete message from the delivery user application;
      provide the order complete message to an online retailer platform to provide to the requesting user via the retailer website or a retailer mobile application, the retailer website and the retailer mobile application being different from the delivery user application;
      after providing the order complete message to the online retailer platform, receive, from the online retailer platform, a payment for the delivery without receiving payment information from the requesting user, the payment including a tip selected by the requesting user at the retailer website or the retailer mobile application after receiving the order complete message; and
      provide the tip to the delivery user.

9. The system of claim 8, further comprising a plurality of delivery user computing devices each configured to operate the delivery user application, the plurality of delivery user computing devices being registered to a different delivery user of a plurality of delivery users, the plurality of delivery users including the delivery user dispatched to fulfill the confirmed request for delivery.

10. The system of claim 9, wherein the delivery user application operates to display items in the order, receive barcode scans of the items, and provide an indication of checkout.

11. The system of claim 10, wherein the indication of checkout is a barcode readable by a device operated at a location associated with the online retailer platform.

12. The system of claim 8, wherein the delivery data store comprises delivery addresses, lists of items, retailer inventories, and delivery user profiles.

13. The system of claim 8, further comprising determining whether the first item and the second item are eligible for delivery by the third party delivery service.

14. The system of claim 8, wherein the delivery user is dispatched via a crowd-sourced delivery service application.

15. The system of claim 8, wherein the two or more delivery window options provides for delivery within the same day that the order is placed.

16. The system of claim 8, wherein the two or more delivery window options are each less than 4 hours in duration.

* * * * *